(12) United States Patent
Yeager

(10) Patent No.: US 7,314,590 B2
(45) Date of Patent: Jan. 1, 2008

(54) METHOD OF PREPARING A COATED MOLDED PLASTIC ARTICLE

(75) Inventor: Mark A. Yeager, McKees Rocks, PA (US)

(73) Assignee: Bayer MaterialScience LLC, Pittsburgh, PA (US)

(*) Notice: Subject to any disclaimer, the term of this patent is extended or adjusted under 35 U.S.C. 154(b) by 0 days.

(21) Appl. No.: 11/230,789

(22) Filed: Sep. 20, 2005

(65) Prior Publication Data

US 2007/0063451 A1 Mar. 22, 2007

(51) Int. Cl.
    *B29C 45/00* (2006.01)
(52) U.S. Cl. ............... 264/255; 264/328.7; 264/328.8
(58) Field of Classification Search ............ None
    See application file for complete search history.

(56) References Cited

U.S. PATENT DOCUMENTS

| | | | | |
|---|---|---|---|---|
| 4,044,984 | A | * | 8/1977 | Shimizu et al. ............ 249/95 |
| 4,076,788 | A | | 2/1978 | Ditto ....................... 264/255 |
| 4,081,578 | A | | 3/1978 | van Essen et al. ......... 428/63 |
| 4,143,852 | A | | 3/1979 | Wiener ..................... 249/135 |
| 4,207,049 | A | | 6/1980 | Malo et al. ............. 425/129 R |
| 4,293,659 | A | | 10/1981 | Svoboda ................... 525/28 |
| 4,331,735 | A | | 5/1982 | Shanoski ................ 428/423.7 |
| 4,366,109 | A | | 12/1982 | Svoboda ................... 264/255 |
| 4,561,625 | A | * | 12/1985 | Weaver ..................... 249/85 |
| 4,668,460 | A | | 5/1987 | Ongena .................... 264/255 |
| 4,688,752 | A | * | 8/1987 | Barteck et al. ............. 249/85 |
| 4,732,553 | A | * | 3/1988 | Hofer ....................... 425/116 |
| 4,840,760 | A | * | 6/1989 | Oishi ....................... 264/245 |
| 4,951,927 | A | * | 8/1990 | Johnston et al. ........... 264/129 |
| 5,002,290 | A | | 3/1991 | Pernin ..................... 277/206 A |
| 5,015,426 | A | * | 5/1991 | Maus et al. .............. 264/40.5 |
| 5,174,933 | A | | 12/1992 | Toh et al. ................. 264/40.5 |
| 5,372,491 | A | * | 12/1994 | Fritsch et al. ............. 425/130 |
| 5,387,750 | A | | 2/1995 | Chiang ..................... 528/52 |
| 5,632,495 | A | | 5/1997 | Speaight et al. ........... 277/177 |

(Continued)

FOREIGN PATENT DOCUMENTS

CA 2 375 668 12/2000

(Continued)

Primary Examiner—Edmund H. Lee
(74) Attorney, Agent, or Firm—Aron Preis

(57) ABSTRACT

A gasket (1) having a reversibly compressible lower portion (17), and an upper portion (14) having at least one upwardly extending extension, is described. The upper portion (14) of the gasket (1) includes a first (34) and optionally a second (37) upwardly extending extension, each having an exterior surface (43, 55). The first and second extensions of the upper portion each have a vertical center line (49, 58) that resides over (or extends through) an underlying exterior longitudinal groove (73, 76) of the lower portion, such that when the gasket is compressed along its vertical center axis (23) a force (79, 82) is exerted laterally outward along (or through) the exterior surfaces of the upwardly extending extensions. The force exerted laterally outward along the exterior surface of an upwardly extending extension serves to maintain a seal (214, 217) formed by abutment of the exterior surface of the extension with a separate surface (e.g., the upper edge (190, 193) of a channel (121) in which the gasket resides) while the gasket is reversibly compressed along its vertical center axis. Also described is a method of preparing a coated molded article (223) in a mold apparatus (8) that includes the gasket of the present invention.

12 Claims, 14 Drawing Sheets

U.S. PATENT DOCUMENTS

| | | | |
|---|---|---|---|
| 5,676,901 A | 10/1997 | Higashi et al. | 264/255 |
| 5,902,534 A | 5/1999 | Fujishiro et al. | 264/255 |
| 6,123,889 A * | 9/2000 | Katagiri et al. | 264/255 |
| 6,143,231 A * | 11/2000 | DiSimone | 264/313 |
| 6,180,043 B1 | 1/2001 | Yonemochi et al. | 264/255 |
| 6,254,366 B1 | 7/2001 | Walton et al. | 418/114 |
| 6,328,920 B1 * | 12/2001 | Uchiyama et al. | 264/255 |
| 6,361,732 B1 | 3/2002 | Schumacher | 264/275 |
| 6,500,376 B1 | 12/2002 | Pack et al. | 264/255 |
| 6,617,033 B1 | 9/2003 | Straus et al. | 428/424.2 |
| 6,676,877 B2 | 1/2004 | Thompson | 264/255 |
| 6,698,708 B1 | 3/2004 | Powers et al. | 249/105 |
| 6,722,660 B2 | 4/2004 | Gernand et al. | 277/591 |
| 6,824,138 B2 | 11/2004 | Matsuki | 277/591 |
| 6,854,737 B2 | 2/2005 | Fieger et al. | 277/630 |
| 6,857,639 B2 | 2/2005 | Beeck et al. | 277/637 |
| 6,861,171 B1 | 3/2005 | Suzuki | 429/34 |
| 6,869,081 B1 | 3/2005 | Jenco | 277/611 |
| 6,887,550 B2 | 5/2005 | Straus et al. | 428/81 |
| 6,936,206 B1 | 8/2005 | Satoh et al. | 264/255 |
| 2003/0038407 A1 | 2/2003 | Bethune | 264/478 |
| 2003/0077426 A1 | 4/2003 | Straus | 428/192 |
| 2003/0099809 A1 | 5/2003 | Straus et al. | 428/81 |
| 2003/0197307 A1 | 10/2003 | Kitamura et al. | 264/255 |
| 2003/0227109 A1 | 12/2003 | Kitamura et al. | 264/255 |
| 2005/0003100 A1 | 1/2005 | Gram | 427/553 |

FOREIGN PATENT DOCUMENTS

| | | |
|---|---|---|
| DE | 2 244 408 | 3/1974 |
| FR | 1 323 614 | 4/1963 |
| FR | 1 545 368 | 11/1968 |
| FR | 1 578 179 | 8/1969 |
| GB | 2 255 084 A | 10/1992 |
| JP | 63-141711 | 6/1988 |
| WO | 02/14719 | 2/2002 |

* cited by examiner

US 7,314,590 B2

METHOD OF PREPARING A COATED MOLDED PLASTIC ARTICLE

FIELD OF THE INVENTION

The present invention relates to a gasket that includes a reversibly compressible lower portion, and an upper portion having at least one upwardly extending extension. The gasket is designed such that when compressed along its vertical center axis a force is exerted laterally outward along (or through) the exterior surfaces of the upwardly extending extensions. The force exerted laterally outward along the exterior surface of an upwardly extending extension serves to maintain a seal formed by abutment of the exterior surface of the extension with a separate surface (e.g., the upper edge of a channel in which the gasket resides) while the gasket is reversibly compressed along its vertical center axis. The present invention also relates to a method of preparing a coated molded article in a mold apparatus that includes the gasket of the present invention.

BACKGROUND OF THE INVENTION

Gaskets have numerous uses that typically involve providing a seal between two opposing surfaces. A gasket may be used, for example, to provide a seal between the internal surfaces of a head member or an intake manifold or an oil filter and the external surface of an engine block, or the internal surfaces of a mold (e.g., a mold used to prepare plastic articles). In many applications, a gasket is compressed between opposing surfaces under static conditions, which are maintained until the opposing surfaces are separated and the seal there-between is broken (e.g., as is the case with an engine oil filter or a plastic injection mold apparatus).

In certain applications, a gasket must maintain a substantially constant seal between opposing surfaces under dynamic conditions, in which the distance between the opposing surfaces is increased and/or decreased (e.g., the opposing surfaces being moved between first and second positions). Examples of applications that require a substantially constant seal under dynamic conditions include, multi-injection molding of plastic articles, and in-mold coating of molded plastic articles. In addition, the distance between opposing surfaces may vary as the result of a combination of the surfaces being fabricated from materials having different coefficients of linear expansion and temperature fluctuations, thus necessitating the need for a gasket that is capable of maintaining a substantially constant seal under such dynamic conditions.

With in-mold coating methods, a plastic material (e.g., a thermoplastic material) is typically first injected into a mold apparatus to form a molded plastic article. The distance between the opposing dies of the mold apparatus is increased, and a coating composition is then injected into the mold, thereby forming a coated molded article. See for example, U.S. Pat. No. 4,076,788. During the plastic injection and coating injection steps, the gasket employed must maintain a substantially constant seal between the opposing dies of the mold apparatus. If the seal is not sufficiently maintained, the injected plastic material and in particular the injected coating material may undesirably leak out of the mold apparatus resulting in wasted material, fouling of the mold and/or the formation of a coated molded article having defective coating surfaces.

It would be desirable to develop a gasket that provides a substantially constant seal between opposing surfaces under dynamic conditions (e.g., as the distance between the opposing surfaces is increased and/or decreased). It would further be desirable to develop an improved method of forming a coated molded article that makes use of such a dynamic gasket.

SUMMARY OF THE INVENTION

In accordance with the present invention, there is provided a gasket comprising an upper portion and a lower portion, said gasket having a longitudinal axis, a vertical center axis that is substantially perpendicular to said longitudinal axis, and a horizontal axis that is substantially perpendicular to said vertical center axis and said longitudinal axis, said upper portion comprising a first upper sidewall, a second upper sidewall, a first extension and a second extension, said upper portion being fabricated from a resilient material, said first extension and said second extension each extending upwardly from said upper portion and each extending substantially continuously in a direction that is substantially parallel with said longitudinal axis, said first extension and said second extension each having an exterior surface, an upper surface, an interior surface, and a vertical center line that is laterally outward from and substantially parallel to said vertical center axis of said gasket, the exterior surface of said first extension defining at least a portion of said first upper sidewall, the exterior surface of said second extension defining at least a portion of the second upper sidewall, the interior surface of said first extension and the interior surface of said second extension together defining an upper longitudinal groove, said upper longitudinal groove being aligned substantially parallel with said longitudinal axis, said lower portion having a base, and a first lower sidewall and a second lower sidewall each extending upwardly from said base, said lower portion being continuous with said upper portion, said first lower sidewall having at least one first exterior longitudinal groove, said second lower sidewall having at least one second exterior longitudinal groove, each first exterior longitudinal groove and each second exterior longitudinal groove being aligned substantially parallel with said longitudinal axis and providing a means by which said gasket is reversibly compressed along said vertical center axis of said gasket, and said lower portion being fabricated from a resilient material, wherein said vertical center line of said first extension resides over said first exterior longitudinal groove, said vertical center line of said second extension resides over said second exterior longitudinal groove, such that when said gasket is compressed along said vertical center axis of said gasket,
a first force is exerted laterally outward along (through) said exterior surface of said first extension, and
a second force is exerted laterally outward along (through) said exterior surface of said second extension.

In accordance with the present invention, there is also provided a gasket as described above, but in which the upper portion includes only a first extension, and an upper surface in place of the second extension.

In accordance with the present invention, there is further provided a method of preparing a coated molded plastic article comprising:
(a) providing a mold apparatus comprising,
  (i) a first die having an inner surface,
  (ii) a second die having an inner surface having at least one channel therein, each channel having a base surface, an open top, a first upper edge and a second upper edge, the inner surface of said first die and the inner surface of said second die are substantially opposed and have a distance there-between, at least one of said first die and said second die being reversibly moveable, such that said distance is reversibly decreased, and (iii) the gasket of the present invention as described above (having either first and second extensions, or just a single first extension), a portion of said gasket residing within said channel, said base of said lower portion of said gasket abutting said base surface of said channel, at least a portion of each of said first extension and said second extension (if present) extending outwardly from said open top of said channel, a portion of said first exterior surface of said first extension abutting sealingly with said first upper edge of said channel forming a first seal, a portion of said exterior surface of said second extension (if present) abutting sealingly with said second upper edge of said channel forming a second seal, and a portion of said inner surface of said first die abuts sealingly with the upper surface of each of said first extension and said second extension;

(b) positioning said first die and said second die at a first distance, thereby forming a parting line between said first die and said second die, and forming a first mold cavity defined in part by the inner surface of said first die and the inner surface of said second die, said gasket being compressed and the upper surface of said first extension and the upper surface of said second extension being substantially level with said parting line;

(c) injecting a plastic material into said first mold cavity, thereby forming a molded plastic article having an upper surface;

(d) positioning said first die and said second die at a second distance, said second distance being greater than said first distance, thereby forming a second mold cavity defined in part by the inner surface of said first die, the upper surface of said molded plastic article and a portion of the exterior surface of said first extension of said gasket; and (e) injecting a coating composition into said second mold cavity, thereby forming said coated molded plastic article, wherein when said first die and said second die are positioned at said first distance and said second distance, said gasket is compressed along said vertical center axis, said first force exerted laterally outward along said exterior surface of said first extension maintains said first seal, and said second force exerted laterally outward along said exterior surface of said second extension maintains said second seal during the plastic material injection step and the coating composition injection step.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWINGS

In FIGS. 1 through 14, unless otherwise indicated, like reference numerals designate the same components and structural features.

DETAILED DESCRIPTION OF THE INVENTION

Figure 1:
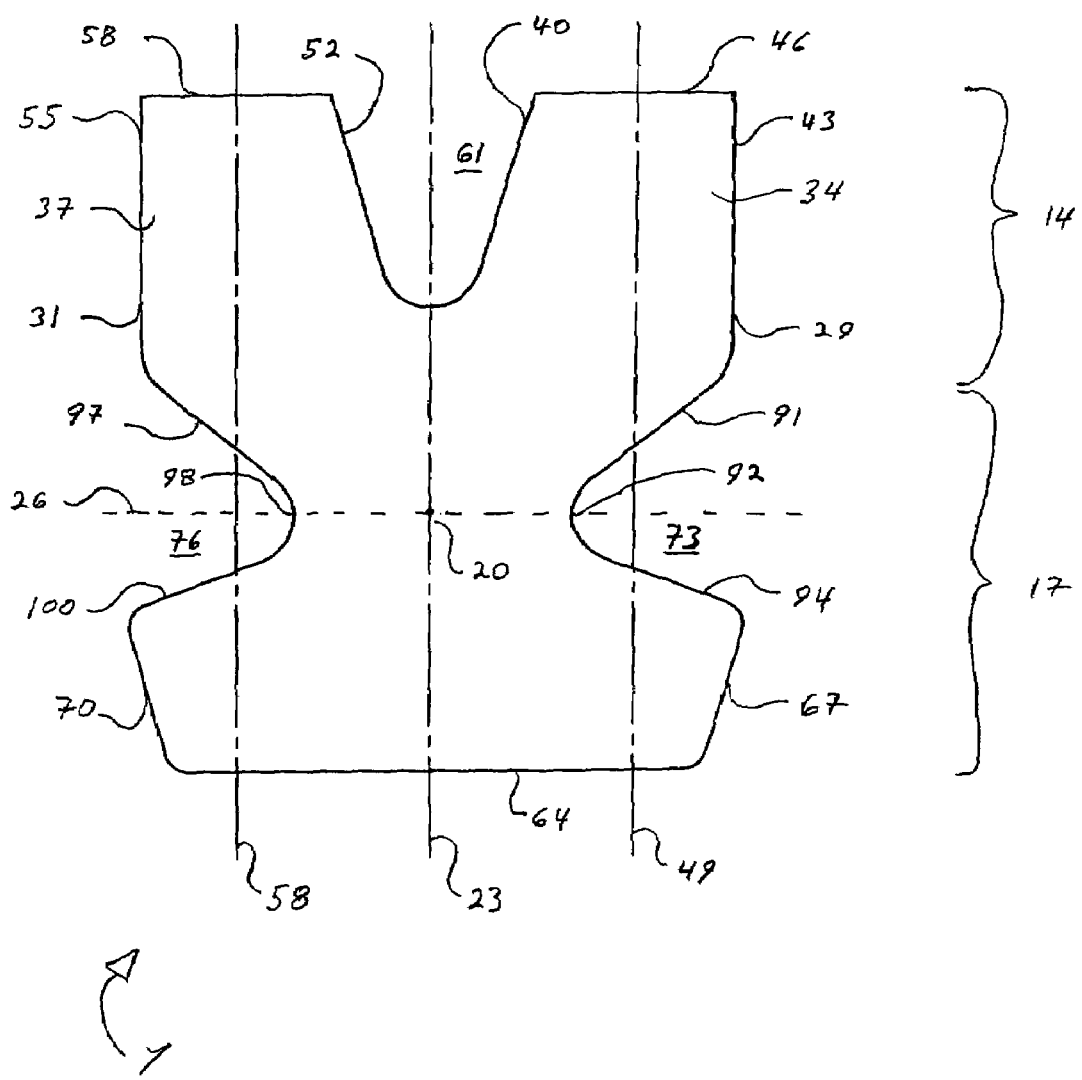
FIG. 1 is a representative sectional view of a gasket according to the present invention.

Referring now to FIG. 1 of the drawings, there is shown a gasket 1 according to the present invention, which includes an upper portion 14 and a lower portion 17. Upper portion 14 and lower portion 17 are continuous one with the other. Gasket 1 has a longitudinal axis 20, a vertical center axis 23 that is substantially perpendicular to longitudinal axis 20, and a horizontal axis 26 that is substantially perpendicular to vertical center axis 23 and longitudinal axis 20. Longitudinal axis 20 is more clearly depicted in FIG. 7 relative to gasket 4, which is also according to the present invention.

Upper portion 14 of gasket 1 includes a first upper sidewall 29, a second upper sidewall 31, a first extension 34 and a second extension 37. The first and second extensions each extend upward from upper portion 14. As first extension 34 and second extension 37 are both part of upper portion 14, they also extend upward and away from lower portion 17. In addition, first extension 34 and second extension 37 each extend substantially continuously in a direction that is substantially parallel with longitudinal axis 20, as is more clearly depicted, for example, in FIG. 7.

First extension 34 has an interior surface 40, an exterior surface 43 and an upper surface 46. Exterior surface 43 of first extension 34 defines at least a portion of first upper sidewall 29. In addition, first extension 34 has a vertical center line 49.

Second extension 37 has an interior surface 52, an exterior surface 55 and an upper surface 58. Exterior surface 55 of second extension 37 defines at least a portion of second upper sidewall 31. Second extension 37 also has a vertical center line 58.

Figure 13:
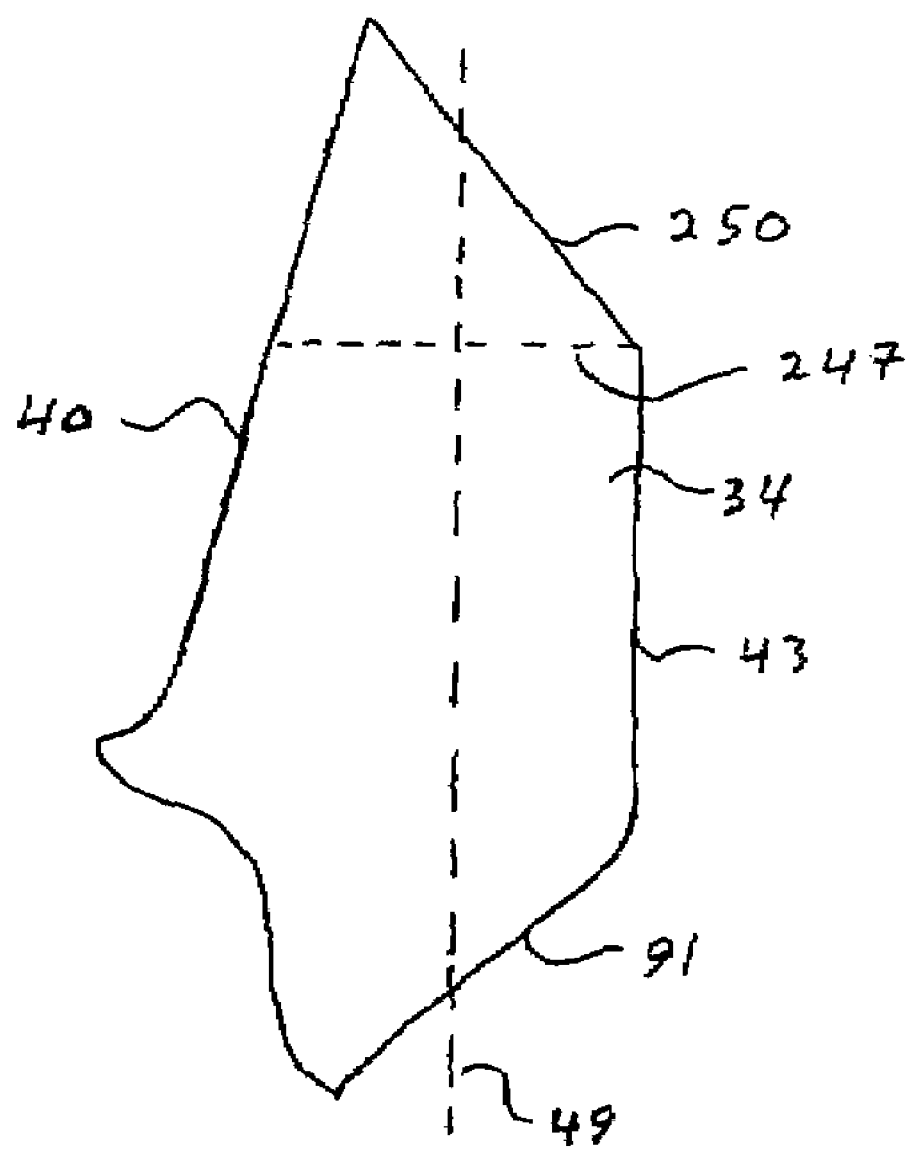
FIG. 13 is a representative sectional view of a portion of a gasket according to the present invention in which the first extension has an angled upper surface.
Figure 14:
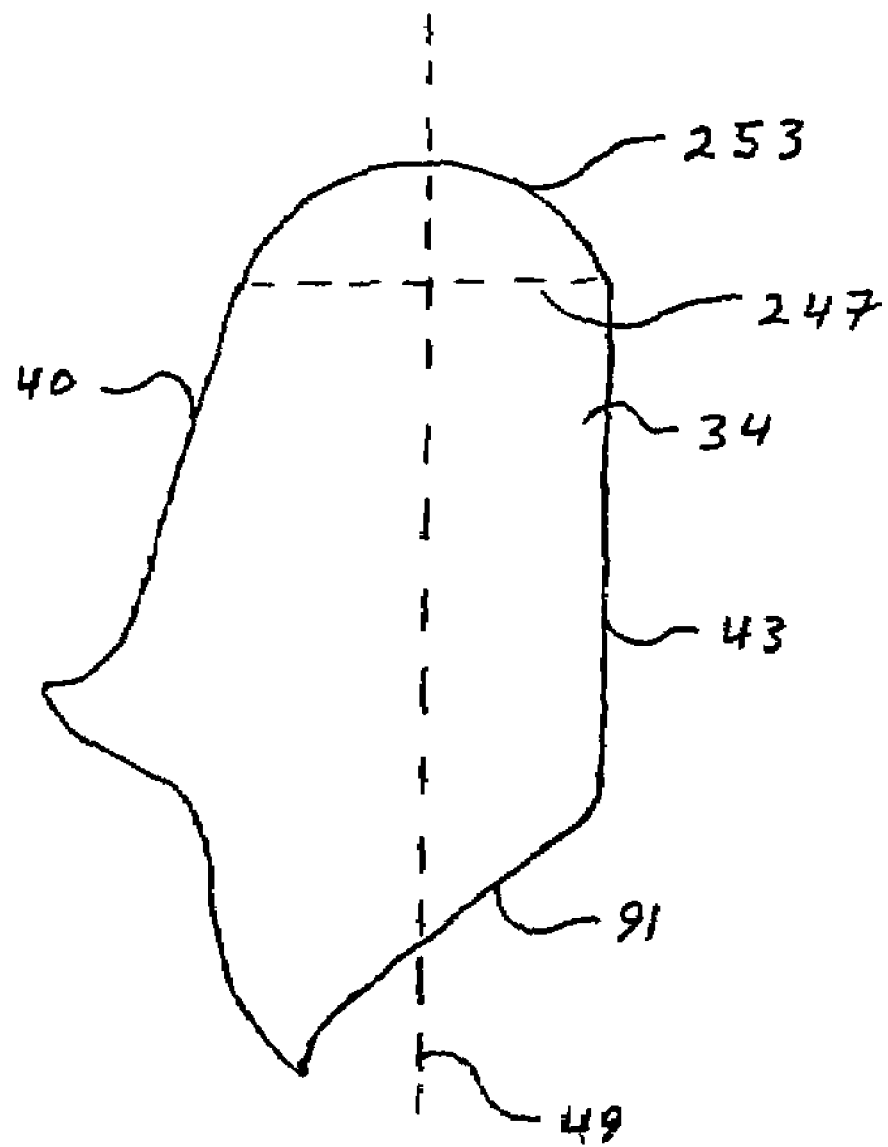
FIG. 14 is a representative sectional view of a portion of a gasket according to the present invention in which the first extension has a convex upper surface.

The position of the vertical center line of an extension of the upper portion of a gasket according to the present invention corresponds substantially to the midpoint of the upper surface of the extension. With reference to FIG. 1, the vertical center line 49 of first extension 34 corresponds to the midpoint of upper surface 46. If the upper surface of an extension is not horizontal or is otherwise irregular (e.g., concave, convex or angled), the midpoint of the upper surface may be determined relative to a hypothetical uppermost horizontal line of the extension extending between the inner and outer surfaces of the extension. The hypothetical uppermost horizontal line is typically located at a point where the exterior surface and/or interior surface of the extension ends and the upper surface of the extension begins. For example, first extension 34 of FIG. 13 has an angled upper surface 250, and a vertical center line 49 that corresponds to the midpoint of hypothetical uppermost horizontal line 247, which extends between interior surface 40 and exterior surface 43 of first extension 34. Hypothetical uppermost horizontal line 247 of FIG. 13 is located at the point where exterior surface 43 ends and angled upper surface 250 begins. For purposes of further illustration, first extension 34 of FIG. 14 has a convex upper surface 253, and a vertical center line 49 that corresponds to the midpoint of hypothetical uppermost horizontal line 247, which extends between interior surface 40 and exterior surface 43 of first extension 34.

Upper surface 46 of first extension 34, and upper surface 58 of second extension 37 may have any suitable shape, provided that they each are capable of forming a seal with the interior (or abutting) surface of an opposing article, such as the die of a mold apparatus, against which they abut when in use. Upper surface 46 and upper surface 58 may each independently be in the form of, for example, a flat surface, a convex surface, a concave surface or an angled surface. For example, if the upper surface of an extension is in the form of a convex surface, the interior (or abutting) surface of the opposing article (e.g., a die) may have a matching concave indentation that is aligned therewith so as to form a seal there-between. Preferably, upper surface 46 and upper surface 58 are each substantially flat (or horizontal) surfaces.

Interior surface 40 of first extension 34 and interior surface 52 of second extension 37 together define an upper longitudinal groove 61. Upper longitudinal groove 61 is aligned substantially parallel with longitudinal axis 20, as more clearly depicted in FIG. 7. The longitudinal groove of the upper portion of the gasket of the present invention may have a cross-sectional shape selected from, for example, V-shapes, U-shapes, rectangular shapes and semi-circular shapes. The cross-sectional shape of the longitudinal groove is typically V-shaped, as depicted with longitudinal groove 61 of FIG. 1.

Lower portion 17 of gasket 1 has a base 64, a first lower sidewall 67 and a second lower sidewall 70. First lower sidewall 67 and second lower sidewall 70 each separately extend upwardly from base 64.

Base 64 of lower portion 17 may have any suitable shape, provided that it is capable of supporting the gasket when abutting against the base surface of a channel in which the gasket is received, as will be discussed in further detail herein. For example, base 64 may be in the form of a flat surface, a convex surface or a concave surface. For example, if base 64 is in the form of a convex surface, the base surface of the channel will typically be in the form of a mating concave surface. Preferably, base 64 is in the form of a substantially flat surface.

First lower sidewall 67 has and defines at least one first exterior longitudinal groove 73. In an embodiment of the present invention, first lower sidewall 67 has more than one first exterior longitudinal groove, e.g., 2, 3, 4, 5 or more first exterior longitudinal grooves (not shown). First exterior longitudinal groove 73 is aligned substantially parallel with longitudinal axis 20 (see FIG. 7).

Second lower sidewall 70 has and defines at least one second exterior longitudinal groove 76. In an embodiment of the present invention, second lower sidewall 70 has more than one first exterior longitudinal groove, e.g., 2, 3, 4, 5 or more second exterior longitudinal grooves (not shown). Second exterior longitudinal groove 76 is aligned substantially parallel with longitudinal axis 20 (see FIG. 7). First exterior longitudinal groove 73 and second exterior longitudinal groove 76 together provide a means by which gasket 1 is reversibly compressed along vertical center axis 23, as will be discussed in further detail herein.

The vertical center line 49 of first extension 34 is positioned and resides over first exterior longitudinal groove 73, and laterally outward from vertical center axis 23. The vertical center line 58 of second extension 37 is positioned and resides over second exterior longitudinal groove 76, and laterally outward from vertical center axis 23. As used herein and in the claims, recitations as to the vertical center line of an extension residing over the corresponding exterior longitudinal groove, refer to the vertical center line: (i) passing or extending through the exterior longitudinal groove; or (ii) passing or extending through the inner most surface of the groove. For example, as depicted in FIG. 1, vertical center line 49 passes through both upper surface 91 and lower surface 94 of exterior longitudinal groove 73. Alternatively, and in accordance with the present invention, vertical center line 49 may pass through (or just touch) inner most surface 92 of exterior longitudinal groove 73 (not shown). Correspondingly, vertical center line 58 of second extension 37 may pass through (or just touch) inner most surface 98 of exterior longitudinal groove 76 (not shown).

Figure 9:
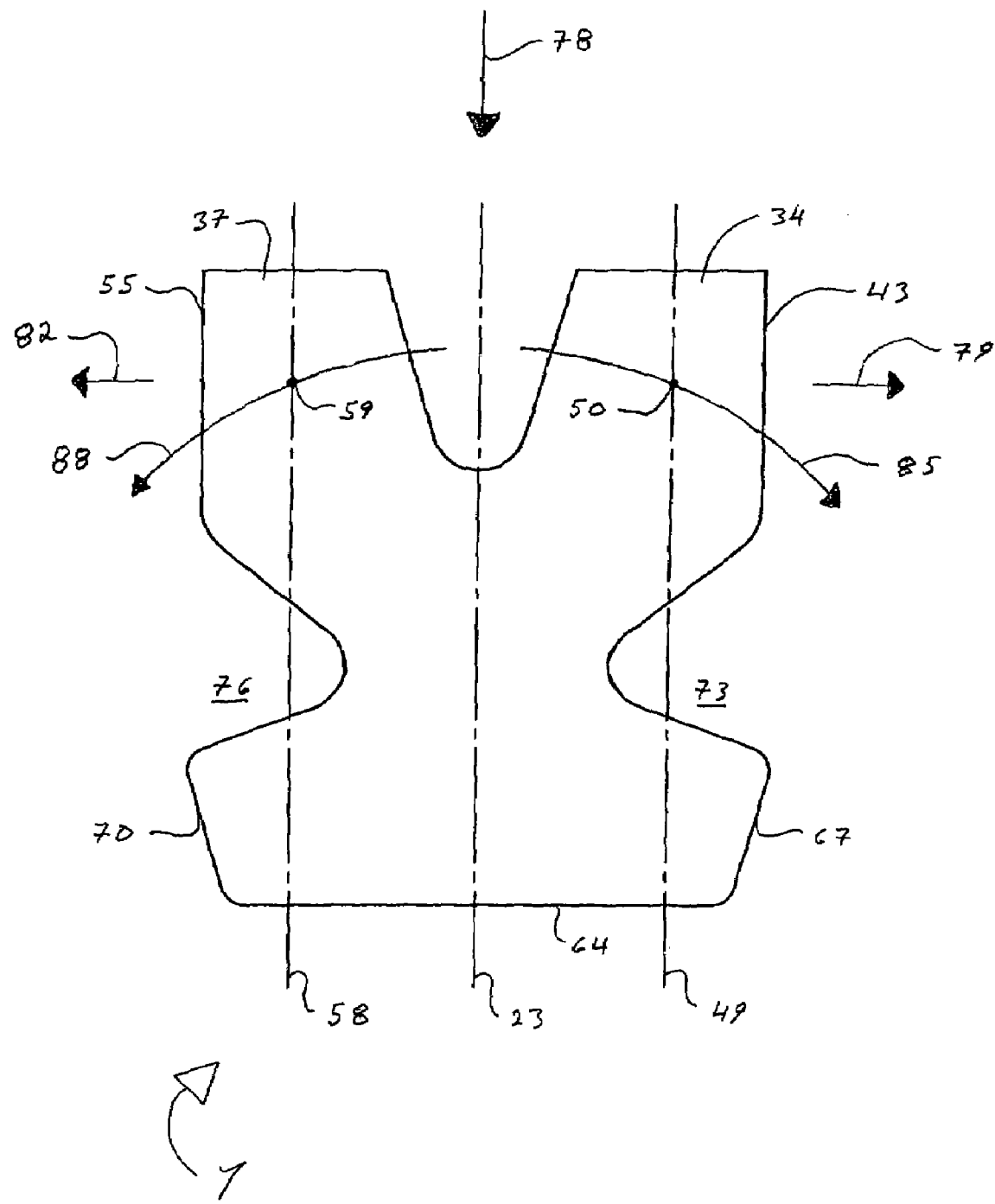
FIG. 9 is a representative sectional view of the gasket of FIG. 1 showing force vectors and arc lines relative to the first and second extensions.

The positioning of the vertical center line of each of the first and second extensions as described provides for the formation of forces that extend laterally outward along the exterior surfaces of the first and second extensions. With reference to FIG. 9, when the gasket is compressed along vertical center axis 23 by means of a vertical force 78, a first force 79 is exerted laterally outward along exterior surface 43 of first extension 34. Correspondingly, as the gasket is compressed along vertical center axis 23, a second force 82 is exerted laterally outward along exterior surface 55 of second extension 37. First force 79 and second force 82 serve to maintain exterior surfaces 43 and 55 of the first 34 and second 37 extensions in sealing relationship with abutting surfaces (not shown), as will be discussed in further detail herein. Lateral force vectors 79 and 82 of FIG. 9 are approximate representations of the horizontal components of force vectors following arcs 85 and 88, respectively.

While not intending to be bound by any theory, and based on the information presently at hand, the outwardly extending lateral forces are deemed to result from a tendency of one or more points along the vertical center line of each extension to arc laterally outward as the gasket is compressed along its vertical center axis. The outward arcing of one or more points along the vertical center line of an extension is due to the positioning of the vertical center line: (i) vertically over the underlying exterior longitudinal groove; and (ii) laterally outward from the vertical center axis of the gasket. With further reference to FIG. 9, a point 50 along vertical center line 49 of first extension 34 passes through a portion of an arc 85 as the gasket is compressed along vertical center axis 23, if there is no separate external surface abutting exterior surface 43 of first extension 34. Correspondingly, a point 59 along vertical center line 58 of second extension 37 passes through a portion of an arc 88 as the gasket is compressed along vertical center axis 23, if there is no separate external surface abutting exterior surface 55 of first extension 37. If separate abutting surfaces are present (not shown in FIG. 9), external surfaces 43 and 55 are pressed (or forced) sealingly against the separate abutting surfaces while the gasket is compressed, because the extensions are prevented by the abutting surfaces from tilting or arcing laterally outward relative to vertical center axis 23.

The first and second exterior longitudinal grooves of the lower portion provide a means by which the gasket of the present invention is reversibly compressed along its vertical center axis. With reference to FIG. 1, first external longitudinal groove 73 has an upper surface 91 and a lower surface 94, and second external longitudinal groove 76 has an upper surface 97 and a lower surface 100. As gasket 1 is compressed along vertical center axis 23, upper surface 91 and lower surface 94 of first longitudinal groove 73 reversibly approach each other, and upper surface 97 and lower surface 100 of second exterior longitudinal groove 76 reversibly approach each other. This reversible approach of the upper and lower surfaces of the external longitudinal grooves allows the gasket to be reversibly compressed along its vertical center axis.

The first and second exterior longitudinal grooves of the gasket of the present invention may be offset from each other. In a preferred embodiment of the present invention the first and second longitudinal grooves are substantially opposed one from the other, as depicted in the drawing figures. With reference to FIG. 1 of the drawings, for example, first exterior longitudinal groove 73 and second exterior longitudinal groove 76 are substantially opposed from each other (or aligned with each other).

Figure 2:
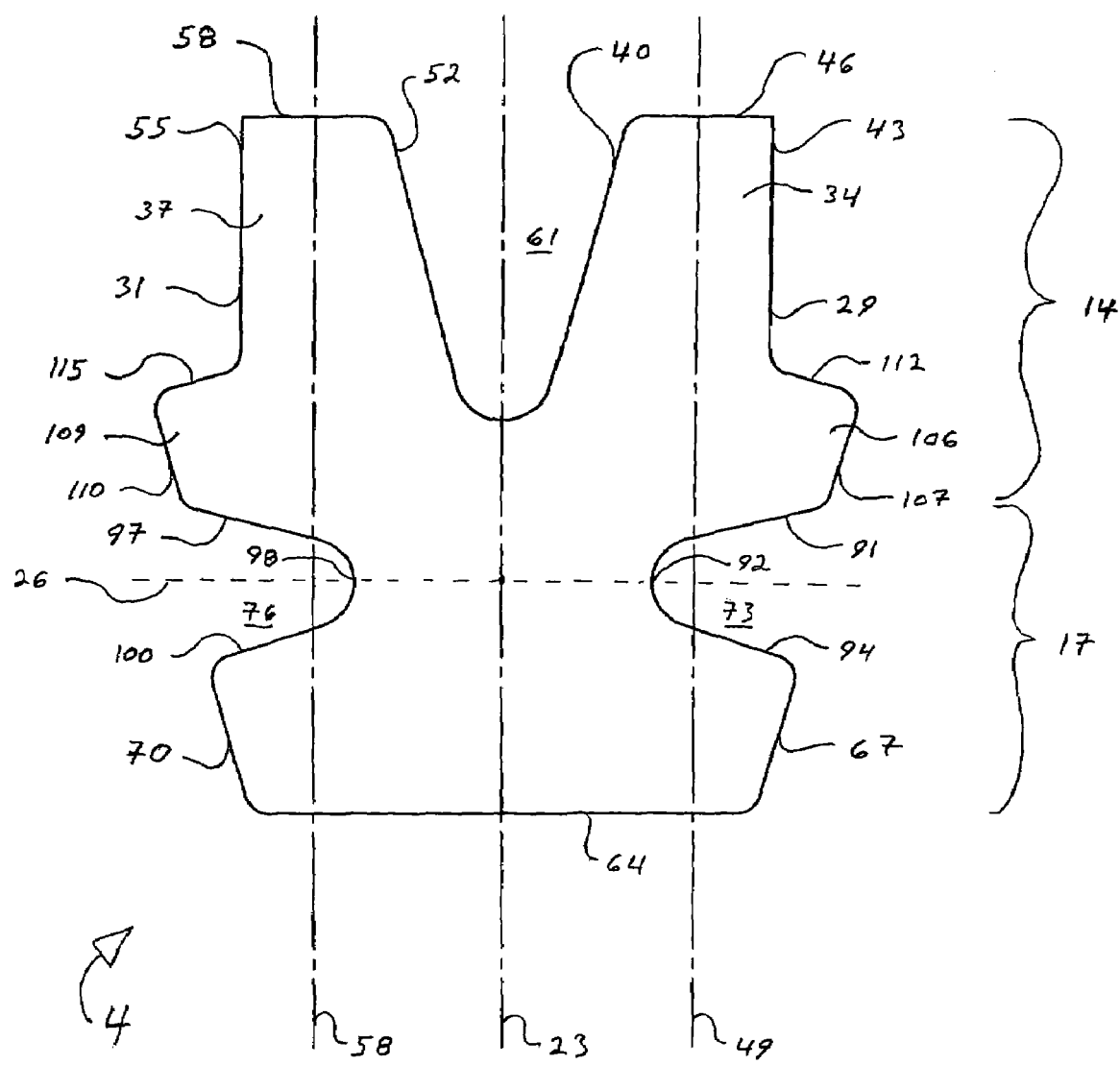
FIG. 2 is a representative sectional view of a gasket according to the present invention that includes a laterally extending first retainer 106 and a laterally extending second retainer 109.

The first exterior longitudinal groove and the second exterior longitudinal groove of the gasket of the present invention may each independently have a cross-sectional shape selected from, for example, V-shapes, U-shapes, rectangular shapes and semi-circular shapes. Typically, the first and second exterior longitudinal grooves have a cross-sectional shape that is substantially V-shaped, as depicted in FIGS. 1 and 2.

Figure 7:
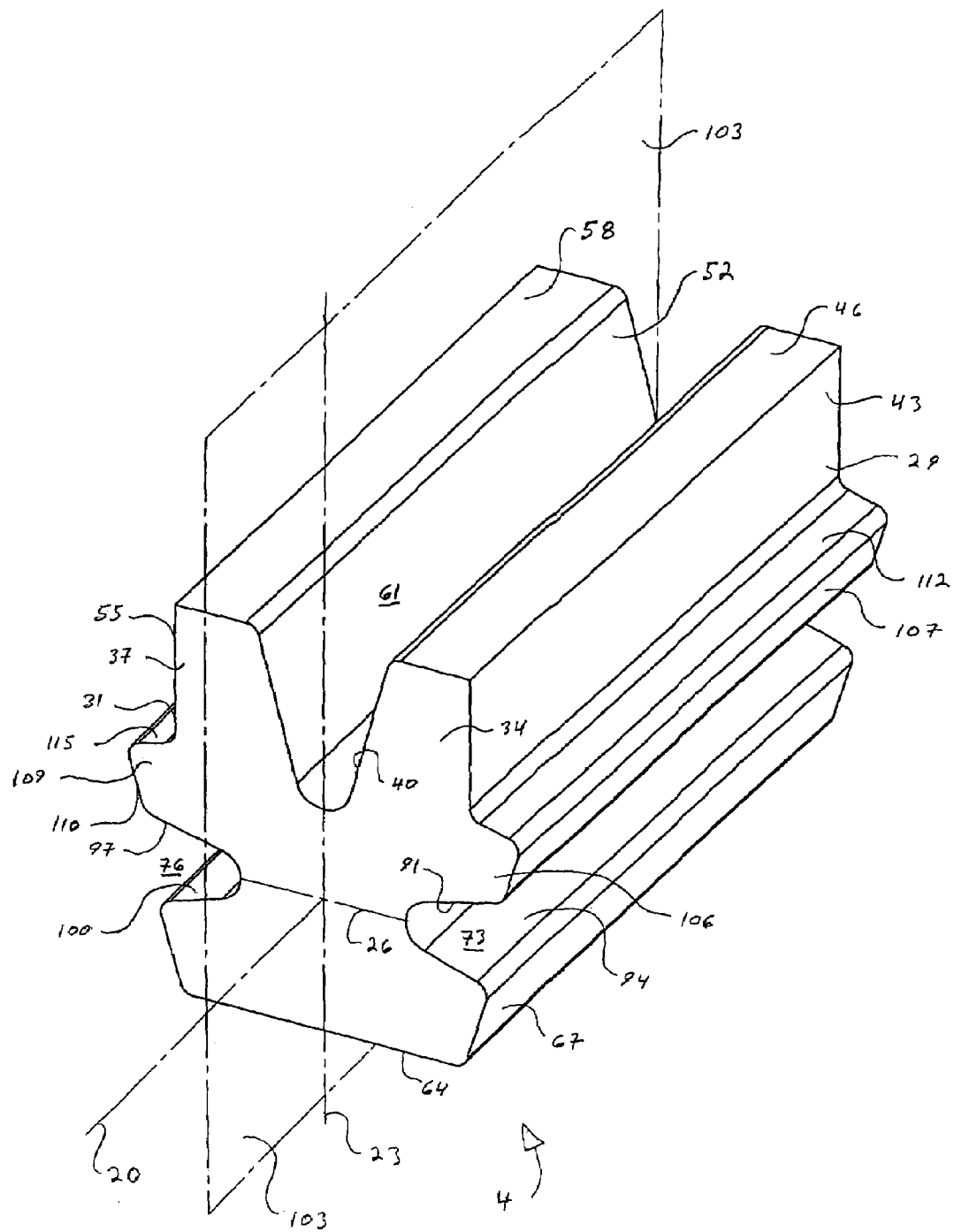
FIG. 7 is a representative perspective view of the gasket of FIG. 2.

The gasket of the present invention may be symmetrical or unsymmetrical relative to the vertical center axis. Preferably, the gasket of the present invention is substantially bilaterally symmetric relative to a plane defined by the vertical center axis and the longitudinal axis. With reference to FIG. 7, gasket 4 is substantially bilaterally symmetric relative to a plane 103 defined by vertical center axis 23 and longitudinal axis 20.

The upper and lower portions of the gasket of the present invention may each be independently fabricated from a resilient material. Classes of resilient materials from which the gasket may be fabricated include, but are not limited to, metals, polymers (e.g., elastomers) and combinations thereof. Metals that may be used include, for example, copper, aluminum and alloys thereof.

Typically, the upper and lower portions of the gasket are each independently fabricated from at least one elastomer. Elastomers from which the upper and lower portions of the gasket may be fabricated, may be selected generally from crosslinked polymers and uncrosslinked polymers. Elastomers from which the gasket of the present invention may be fabricated include, but are not limited to: aromatic-diene copolymers (e.g., styrene-butadiene copolymers); polyhaloprenes (e.g., polychloroprene); fluoropolymers; rubbers, such as natural rubber, nitrile rubber (e.g., hydrogenated nitrile rubber), butyl rubber, polysulfide rubber, silicone rubber, halosilicone rubber (e.g., fluorosilicone rubber), polyurethane rubbers, ethylene-propylene-diene terpolymers (e.g., EPDM rubber), and thermoplastic olefins (e.g., TPO rubbers); polyisoprene (e.g., cis-1,4-polyisoprene); and oxirane (or epoxy) based elastomers. Where appropriate, these elastomers may be crosslinked (or vulcanized) with, for example, sulfur and peroxides, as is known to the skilled artisan.

The gasket of the present invention may be fabricated by methods that are known to the skilled artisan (e.g., injection molding, cast molding and extrusion). Typically, the elastomeric materials of the upper and lower portions of the gasket are concurrently extruded. In a preferred embodiment of the present invention, the upper and lower portions of the gasket are fabricated from the same resilient material (e.g., elastomeric silicone polymers or elastomeric fluoropolymers).

The resilient material from which the gasket of the present invention is fabricated may further include additives, such as reinforcing agents selected from, for example, glass fibers, glass beads, carbon fibers, nano-tubular carbon fibers, boron fibers, metal fibers and combinations thereof. Reinforcing agents may be present in the resilient material from which the gasket is fabricated, in reinforcing amounts, e.g., in amounts of from 0.1 percent by weight to 30 percent by weight, based on the total weight of the resilient material.

Further additives that may be present in the resilient material from which the gasket is fabricated include, but are not limited to, antioxidants, colorants, e.g., pigments and/or dyes, mold release agents, fillers (e.g., calcium carbonate and barium sulfate), ultraviolet light absorbers, fire retardants and mixtures thereof. Additives may be present in the resilient material from which the gasket is fabricated, in functionally sufficient amounts, e.g., in amounts independently from 0.1 percent by weight to 10 percent by weight, based on the total weight of the resilient material.

In an embodiment of the present invention, and with reference to FIGS. 2 and 7 of the drawings, the upper portion 14 of gasket 4 further includes a first retainer 106 that extends laterally outward from first upper sidewall 29 of first extension 34, and a second retainer 109 that extends laterally outward from second upper sidewall 31 of second extension 37. First retainer 106 has an upper surface 112 and an exterior surface 107, and second retainer 109 has an upper surface 115 and an exterior surface 110.

Exterior surface 43 of first extension 34 extends upwardly from first retainer 106. More specifically, exterior surface 43 of first extension 34 extends upwardly from upper surface 112 of first retainer 106. Similarly, exterior surface 55 of second extension 37 extends upwardly from second retainer 109 (and more specifically, upwardly from upper surface 115 of second retainer 109).

Figure 10:
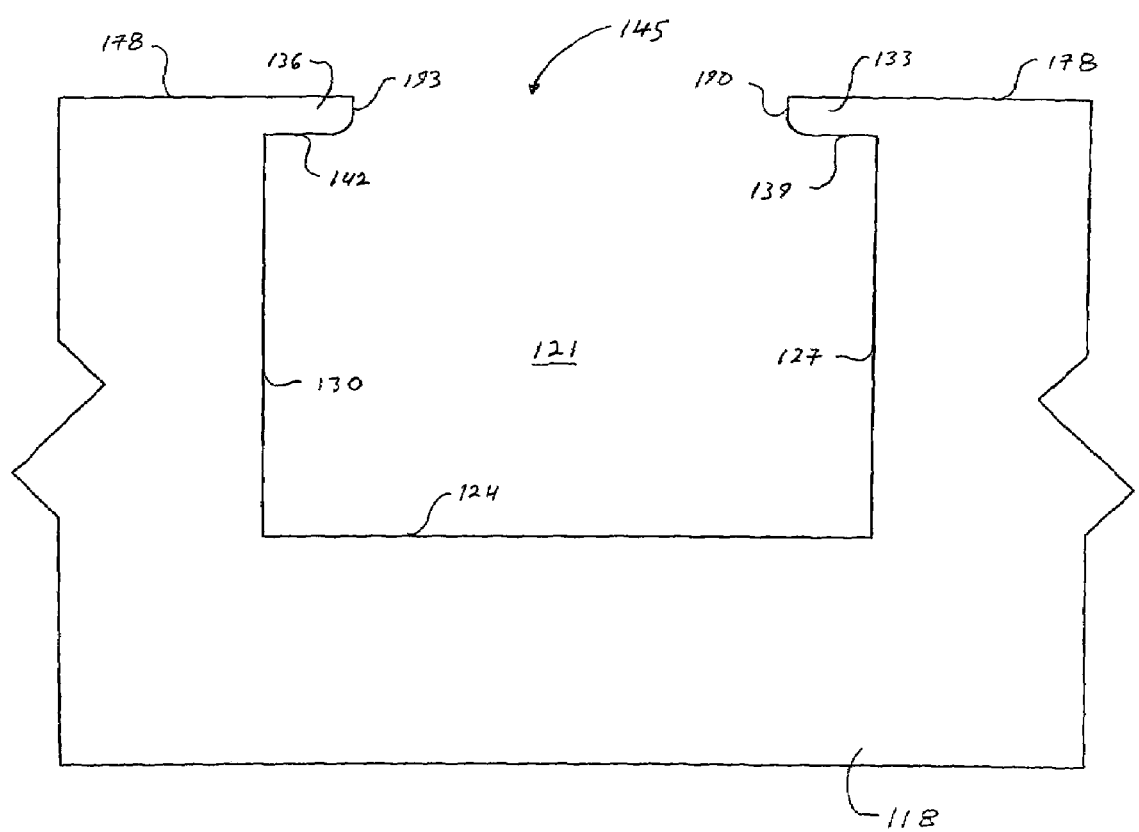
FIG. 10 is a representative sectional view of a portion of the second die of the mold apparatus depicted in FIGS. 3-5, showing channel 121 without gasket 4 received therein.
Figure 11:
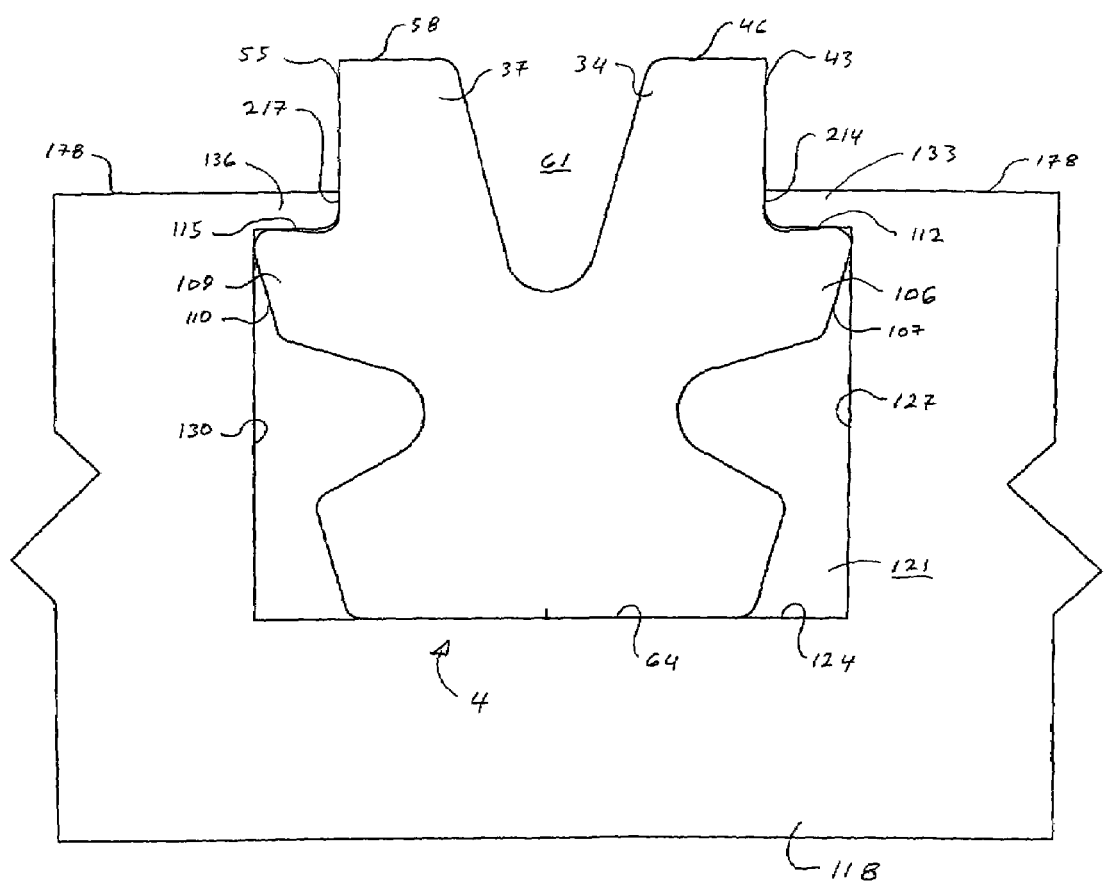
FIG. 11 is a representative sectional view of the portion of the second die of FIG. 10 showing gasket 4 received within the channel thereof.

The first and second retainers serve to retain the gasket within a channel that is dimensioned to receive the gasket. With reference to FIGS. 10 and 11 of the drawings, a shaped article 118 (e.g., a die of a mold apparatus) has a channel 121 that is dimensioned to receive gasket 4 therein. Channel 121 has a base wall 124, a first sidewall 127, a second sidewall 130, and an open top 145 through which first extension 34 and second extension 37 of gasket 4 outwardly extend. Channel 121 (and open top 145 thereof) are further defined by a first ledge 133 that extends over a first portion of channel 121, and a second ledge 136 that extends over a second portion of channel 121. First ledge 133 has a lower surface 139, and second ledge 136 has a lower surface 142. Base 64 of gasket 4 abuts base wall 124 of channel 121, upper surface 112 of first retainer 106 abuts lower surface 139 of ledge 133, and upper surface 115 of second retainer 109 abuts lower surface 142 of second ledge 136, thereby retaining reversibly gasket 4 within channel 121.

At least a portion of the exterior surface of each retainer may optionally abut a portion of the interior sidewalls of the channel in which the gasket is received, in accordance with the present invention. With reference to FIGS. 10 and 11, a portion of exterior surface 107 of first retainer 106 abuts a portion of first sidewall 127 of channel 121. A portion of exterior surface 110 of second retainer 109 abuts a portion of second sidewall 130 of channel 121. Abutment of a portion of the exterior surfaces of the retainers with a portion of the interior sidewalls of the channel serves to further retain and stabilize the gasket within the channel.

In an embodiment of the present invention, the upper portion of the gasket includes at least one further extension that is interposed between the first and second extensions. The gasket may include, for example, 1, 2, 3, 4, 5 or more further extensions. Typically, the gasket of the present invention may include one further extension.

Figure 8:
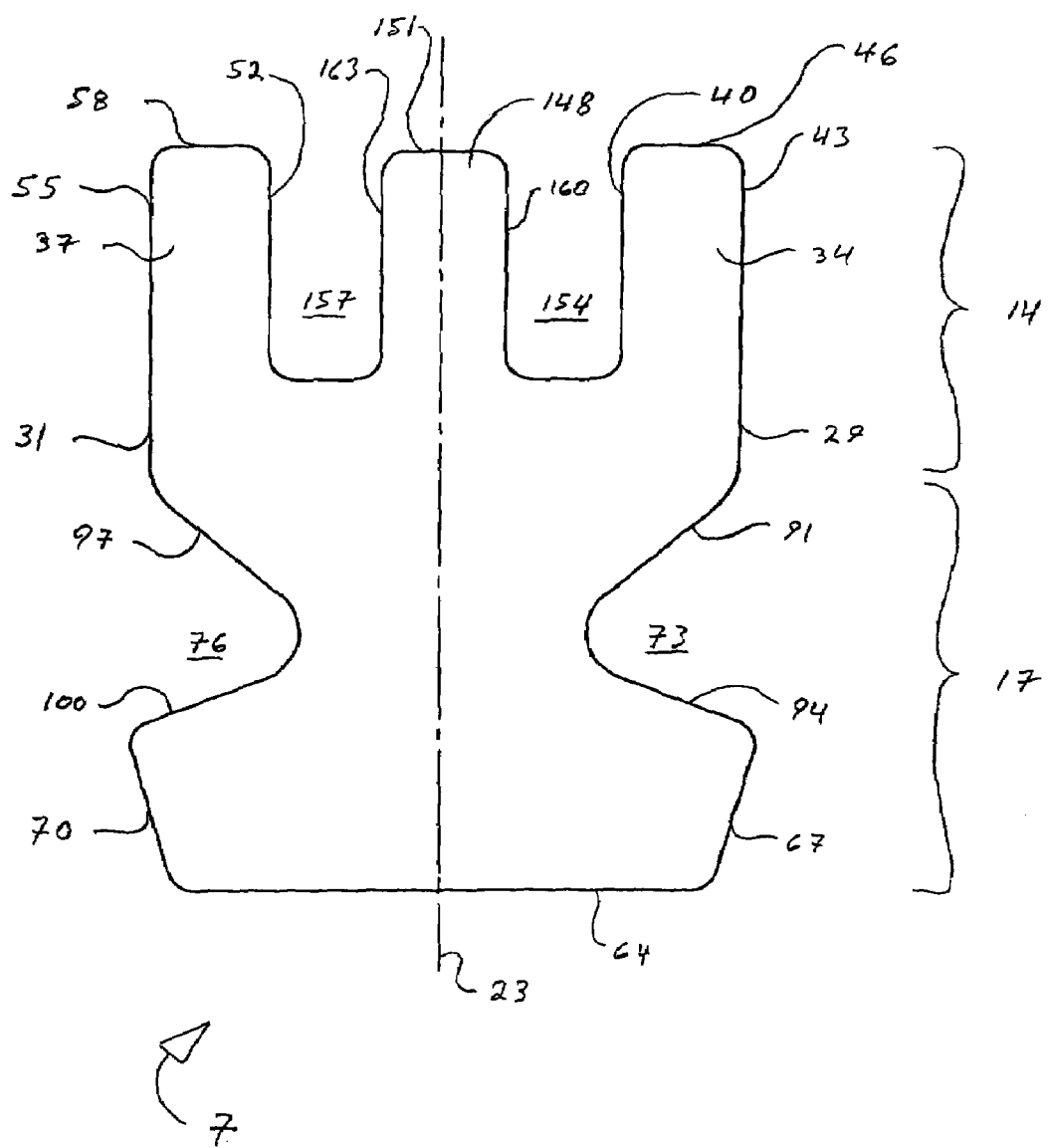
FIG. 8 is a representative sectional view of a gasket according to the present invention that includes a further extension that is interposed between the first and second extensions.

With reference to FIG. 8 of the drawings, gasket 7 includes a further extension 148 that is interposed between first extension 34 and second extension 37. Extension 148 extends upwardly from upper portion 14 and away from lower portion 17. Extension 148 also extends in a direction that is substantially parallel with the longitudinal axis of the gasket (not shown, but see longitudinal axis 20 of FIG. 7 for reference). Further extension 148 has an upper surface 151, a first sidewall 160 and a second sidewall 163. The further extensions, such as further extension 148, divide the longitudinal groove (e.g., longitudinal groove 61 of FIG. 1) into further longitudinal grooves. The number of further longitudinal grooves may be calculated from the following equation:

(2+the number of further extensions)− (1)

Gasket 7 of FIG. 8 has one further extension, and accordingly also has two further longitudinal grooves 154 and 157, each of which is substantially parallel with the longitudinal axis of the gasket. If two further extensions were present, there would be 3 further longitudinal grooves. The further longitudinal grooves are each substantially parallel with the longitudinal axis of the gasket.

Each pair of adjacent extensions defines a further longitudinal groove. For example, adjacent extensions 37 and 148 together define further longitudinal groove 157, and adjacent extensions 148 and 34 define further longitudinal groove 154. More particularly, inner surface 40 of first extension 34 and first sidewall 160 of further extension 148 together define further longitudinal extension 154, and inner surface 52 of second extension 37 and second sidewall 163 of further extension 148 together define further longitudinal groove 157. Each further longitudinal groove may have a cross-sectional shape selected from, for example, V-shapes, U-shapes, rectangular shapes and semi-circular shapes.

In an embodiment of the present invention, the upper portion of the gasket has a single extension extending upwardly therefrom, rather than two extensions (e.g., rather than a first extension and a second extension). In place of a second extension, the upper portion of the gasket has an upper surface that resides below (or lower than) the upper surface of the single extension. The upper surface of the upper portion is dimensioned to abut against the surface of an opposing article (e.g., the die of a mold) that compresses the gasket along its vertical center axis.

Figure 6:
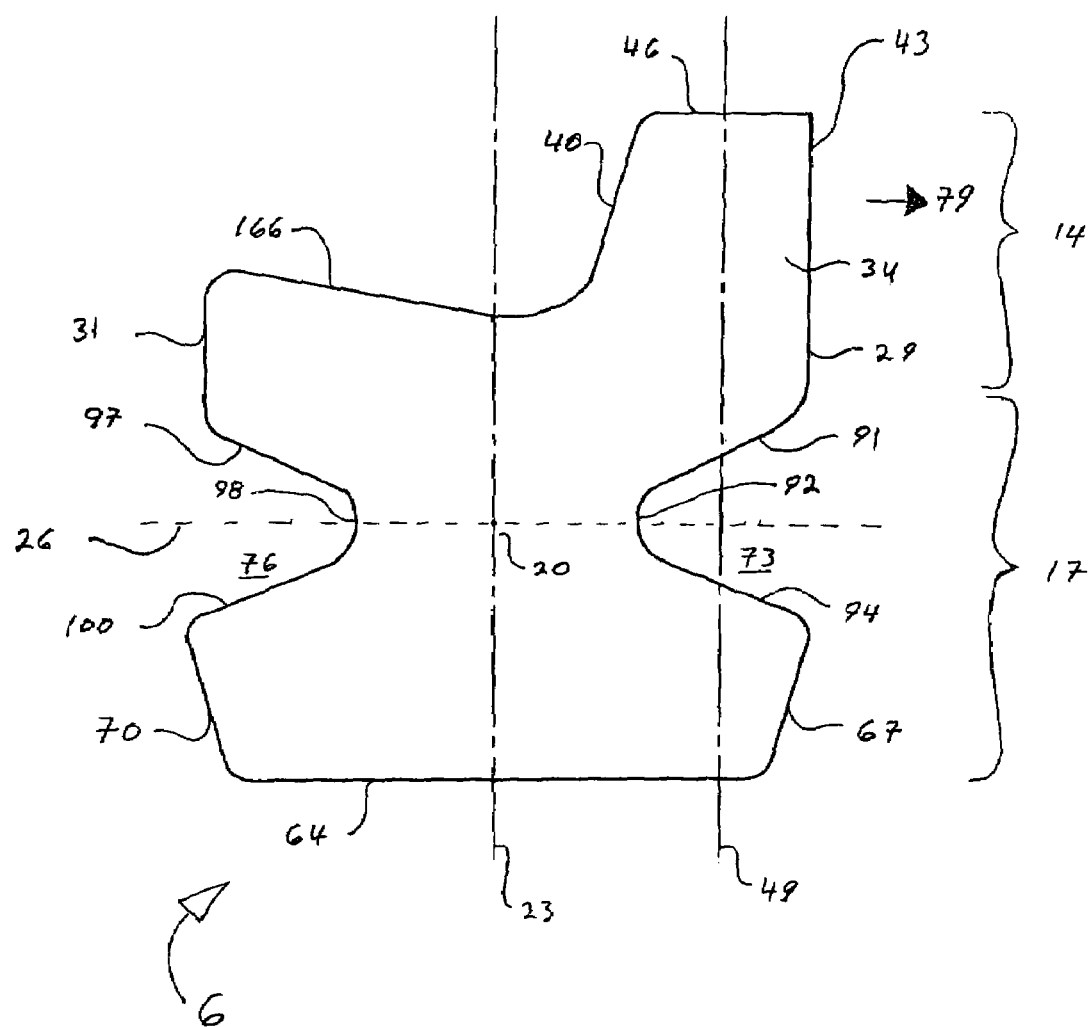
FIG. 6 is a representative sectional view of a gasket according to the present invention that includes a single upwardly extending extension.

With reference to FIG. 6 of the drawings, there is depicted a gasket 6 according to the present invention, in which the upper portion 14 has a single extension 34 extending upwardly therefrom. Gasket 6 includes an upper portion 14, a lower portion 17, a longitudinal axis 20, a vertical center axis 23 that is substantially perpendicular to longitudinal axis 20, and a horizontal axis 26 that is substantially perpendicular to vertical center axis 23 and longitudinal axis 20.

Upper portion 14 includes a first upper sidewall 29, a second upper sidewall 31, first extension 34 and an upper surface 166. First extension 34 extends upwardly from upper portion 14 and extends substantially continuously in a direction that is substantially parallel with longitudinal axis 20. First extension 34 has an exterior surface 43, an upper surface 46, and an interior surface 40. Exterior surface 43 of first extension 34 defines at least a portion of first upper sidewall 29. First extension 34 also has a vertical center line 49 that is substantially parallel to vertical center axis 23 of gasket 6. The position of vertical center line 49 of first extension 34 is determined relative to the midpoint of upper surface 46, as discussed previously here (e.g., with regard to gaskets 1 and 4). Upper surface 166 of upper portion 14 resides below (or lower than) upper surface 46 of first extension 34.

The lower portion 17 of gasket 6 has a base 64, and a first lower sidewall 67 and a second lower sidewall 70 each of which extends upwardly from base 64. First lower sidewall 67 has at least one first exterior longitudinal groove 73, and second lower sidewall 70 has at least one second exterior longitudinal groove 76. Each first exterior longitudinal groove 73 and each second exterior longitudinal groove 76 are aligned substantially parallel with longitudinal axis 20 and provide a means by which gasket 6 is reversibly compressed along vertical center axis 23, as discussed previously herein with regard to gaskets 1 and 4.

The vertical center line 49 of first extension 34 of gasket 6 resides over first exterior longitudinal groove 73 and laterally outward from vertical center axis 23, such that when gasket 6 is compressed along vertical center axis 23 a force 79 is exerted laterally outward along exterior surface 43 of first extension 34.

The positioning of the vertical center line 49 of first extension 34 of gasket 6 as described provides for the formation of a force 79 that extends laterally outward along the exterior surface 43 of the first extension 34. Laterally outward extending force 79 as depicted in FIG. 6 may be described in accordance with the disclosure provided previously herein with regard to gasket 1 and FIG. 9. If a separate abutting surface is present (not shown in FIG. 6), external surface 43 is pressed (or forced) sealingly against the separate abutting surface while gasket 6 is compressed, since extension 34 is prevented by the abutting surface from tilting or arcing laterally outward relative to vertical center axis 23.

Lower portion 17 of gasket 6 is continuous with upper portion 14 thereof. Upper portion 14 and lower portion 17 of gasket 6 are each independently fabricated from a resilient material, which may be selected from those resilient materials as discussed previously herein, in particular elastomers.

To provide for substantially uniform compression of gasket 6, an opposing surface (not shown), such as the interior surface of a die, may be provided with an extension (not shown) that concurrently abuts at least a portion of upper surface 166 of upper portion 14, and upper surface 46 of extension 34. The concurrent abutment of surface 166 and surface 46 by an opposing surface(s) allows for substantially uniform compression of gasket 6 along vertical center axis 23.

Figure 12:
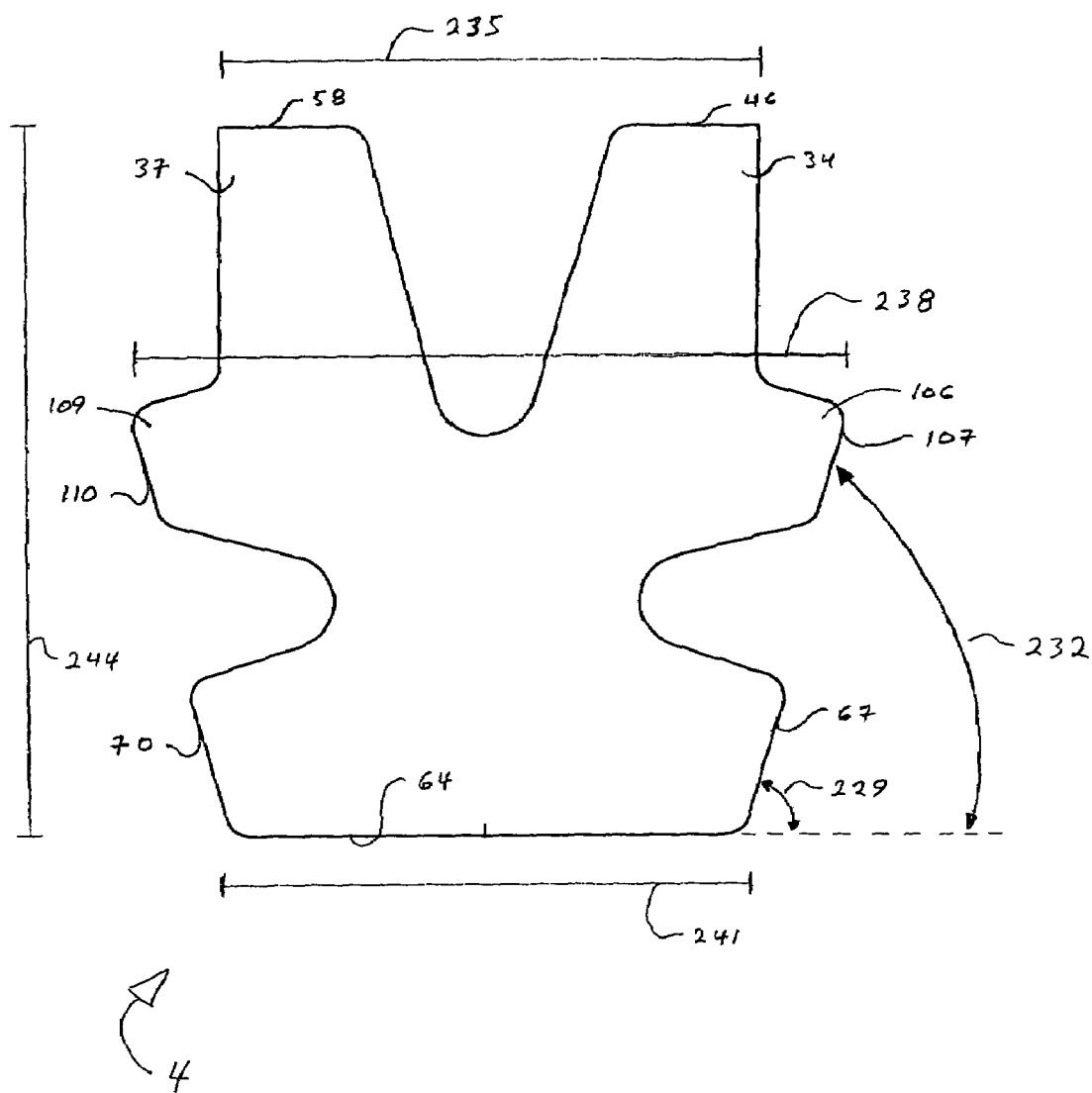
FIG. 12 is a representative sectional view of the gasket of FIG. 2 including dimensional lines and angles.

The gasket of the present invention may be of any suitable size, depending on the application in which it is used. With reference to FIG. 12, the gasket 4 typically has: a height 244 of from 5 mm to 31 cm (as measured from the base surface of the lower portion to the upper surface of the extensions); a top width 235 of from 5 mm to 31 cm (as measured from the exterior surfaces of the first and second extensions; and a bottom width 241 of from 5 mm to 31 cm (as measured along the base 64 of the lower portion). If the gasket includes retainers (e.g., retainers 106 and 109) the width relative to the outermost points of the retainers (retainer-to-retainer width 238) may be from 5 mm to 31 cm. The ratio between height 244 and top width 235, and between height 244 and base width 241 of the gasket are each independently typically from 0.8:1.0 to 3.0:1.0, more typically from 1.0:1.0 to 2.5:1.0, and further typically from 1.2:1.0 to 1.8:1.0. The ratio between top width 235 and base width 241 of the gasket is typically from 0.5 to 1.0 to 2.0 to 1.0, and more typically from 0.8:1.5 to 1.0:1.0. The ratio between height 244 and the retainer-to-retainer width 238 of the gasket is typically from 0.8:1.0 to 1.5:1.0, and more typically from 0.9:1.0 to 1.2:1.0.

The sidewalls (e.g., 67 and 70) of the lower portion of the gasket may each independently form a 90° angle relative to the base (e.g., 64). Alternatively, the sidewalls may each independently form an angle of greater than 90° relative to the base (e.g., 105° to 120°). More typically, the sidewalls of the lower portion may each independently form an angle of from 45° to less than 90°, e.g., from 45° to 85°, from 60° to 80°, or from 65° to 78°. Sidewalls of the lower portion forming angles of 90° or less, relative to the base, are preferred for purposes of improving the ease with which the gasket of the present invention may be inserted into a channel dimensioned to receive it. For example, lower sidewall 67 of gasket 4 of FIG. 12 forms an angle 229 with base 64 that is approximately 74°.

The outward exterior surfaces (e.g., 107 and 110) of the retainers (e.g., 106 and 109) of the gasket of the present invention may each independently form angles relative to the base which are selected from those ranges recited previously herein with regard to the sidewalls of the lower portion. Preferably the outward exterior surfaces of the retainers preferably from angles of 90° or less, relative to the base, for purposes of improving the ease with which the gasket of the present invention may be inserted into a channel dimensioned to receive it. For example, outward exterior surface 107 of retainer 106 forms an angle 232 with base 64 that is approximately 74°.

The present invention also relates to a method of preparing a coated plastic article. With reference to FIGS. 3-5, 10 and 11 of the drawings, there is depicted a mold apparatus 8 that includes a first die 169 that has an inner surface 172. Mold apparatus 8 also includes a second die 118 having an inner surface 178 and a channel 121 therein. Inner surface 172 of first die 169 and inner surface 178 of second die 118 are substantially opposed to each other and have a distance (e.g., 197) between them. First die 169 and/or second die 118 are reversibly moveable such that the distance between their respective inner surfaces (e.g., 172 and 178) is reversibly decreased (and accordingly, reversibly increased).

As described previously herein with reference to FIGS. 10 and 11, channel 121 of die 118 has a base surface 124, a first sidewall 127, a second sidewall 130 and an open top 145. The open top 145 and channel 121 are further defined by a first ledge 133 and a second ledge 136, each extending over a portion of channel 121. First ledge 133 defines a first upper edge 190 of channel 121, and second ledge 136 defines a second upper edge 193 of channel 121.

Mold apparatus 8 further includes a gasket 4, at least of portion of which resides within channel 121. Base 64 of gasket 4 abuts base surface 124 of channel 121. Depending on the initial positioning of dies 169 and 118, at least a portion of first extension 34 and second extension 37 of gasket 4 may extend outwardly from the open top 145 of channel 121.

A portion of exterior surface 43 of first extension 34 of gasket 4 abuts sealingly with first upper edge 190 of channel 121 forming a first seal 214, and a portion of exterior surface 55 of second extension 37 of gasket 4 abuts sealingly with second upper edge 193 of channel 121 forming a second seal 217. In addition, a portion of inner surface 172 of first die 169 abuts sealingly with upper surface 46 of first extension 34 and upper surface 58 of second extension 37 of gasket 4.

Figure 3:
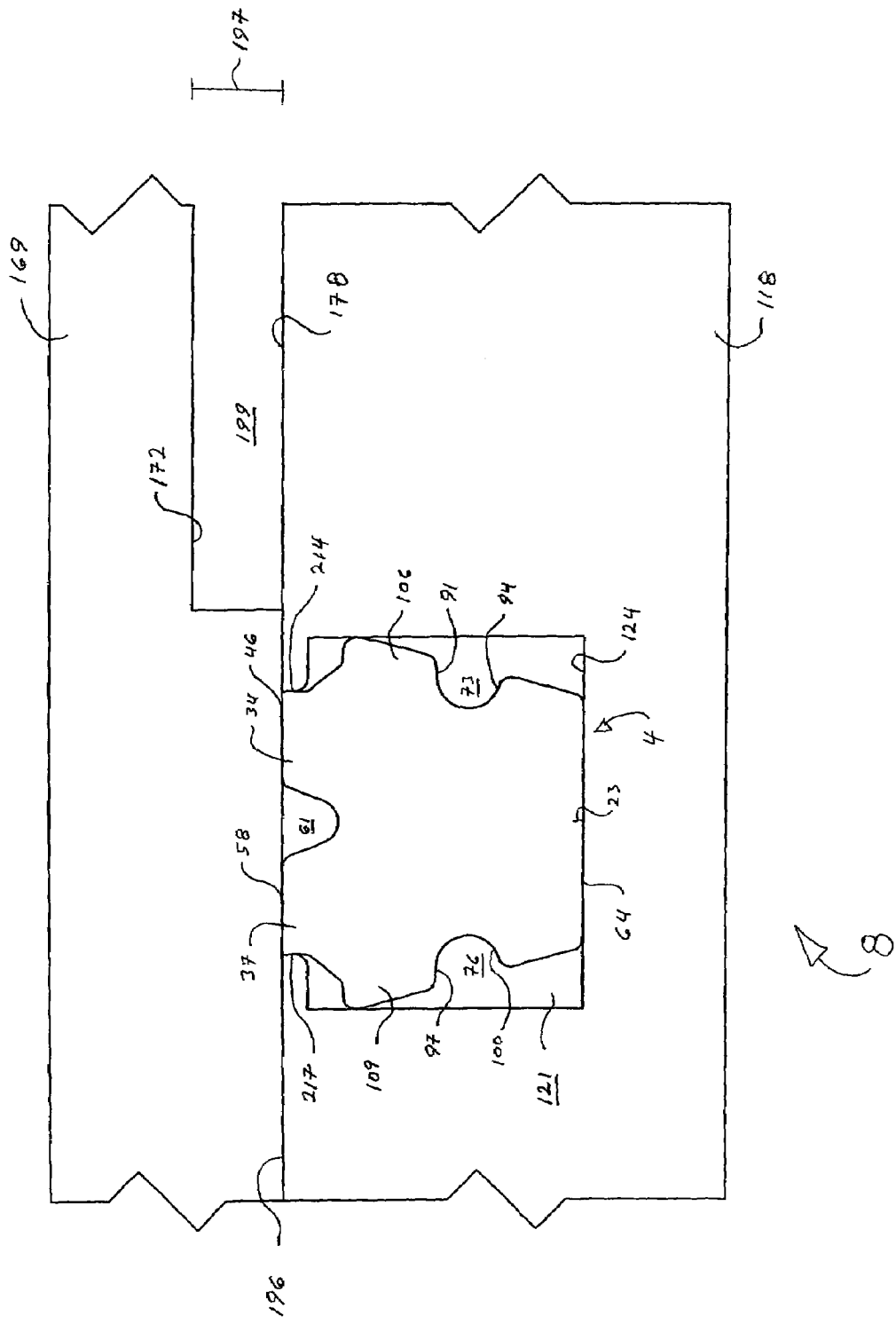
FIG. 3 is a representative sectional view of a mold apparatus that includes the gasket of the present invention, in which the first and second dies are positioned to allow for injection of plastic material into a first mold cavity.

In the process of the present invention, first die 169 and second die 118 of mold apparatus 8 are positioned at a first distance 197 (see FIG. 3), which results in the formation of a parting line 196 between a portion of the dies, and a first mold cavity 199. Upper surface 46 of first extension 34 and upper surface 58 of second extension 37 are each substantially level (or flush) with parting line 196 when dies 169 and 118 of mold apparatus 8 are positioned as depicted in FIG. 3. First mold cavity 199 is defined in part by inner surface 172 of first die 169 and inner surface 178 of second die 118.

A plastic material is injected into first mold cavity 199 resulting in the formation of a molded plastic article 202 having an upper surface 205. See FIG. 4.

The first die 169 and the second die 118 are positioned at a second distance 208 that is greater than first distance 197, which results in the formation of a second mold cavity 211. Second mold cavity 211 is defined in part by inner surface 172 of first die 169, upper surface 205 of molded plastic part 202 and a portion of exterior surface 43 of first extension 34 of gasket 4.

Figure 4:
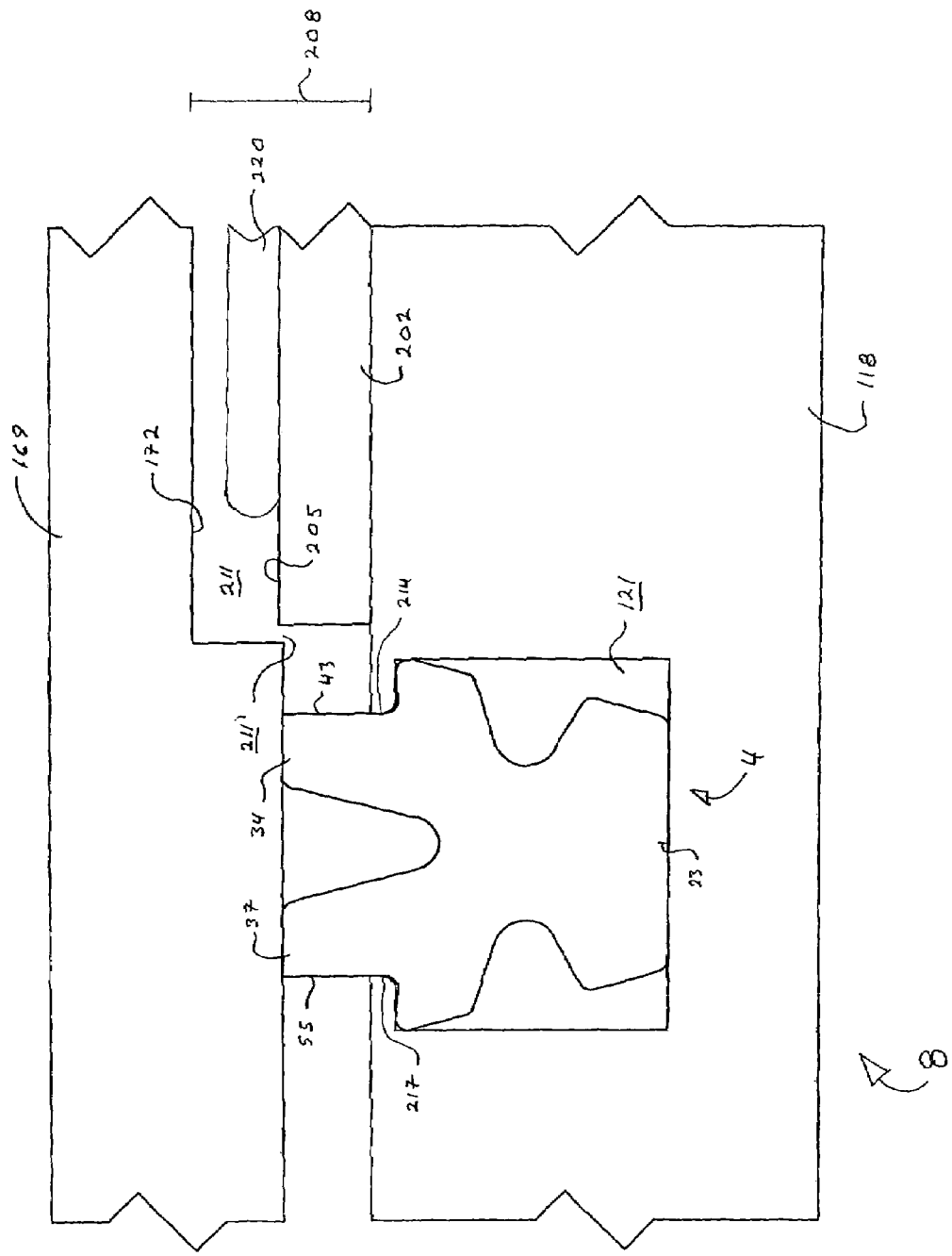
FIG. 4 is a representative sectional view of the mold apparatus of FIG. 3, in which the first and second dies are positioned to allow for the injection of a coating composition into a second mold cavity.

A portion of second mold cavity 211, which is depicted as 211' in FIG. 4, is formed in part due to retraction or shrinkage the plastic material that is injected into first mold cavity 199 as it cools and/or cures to form molded plastic article 202. Shrinkage or retraction of the injected plastic material is typically more pronounced when the injected plastic material is a thermoplastic material.

Figure 5:
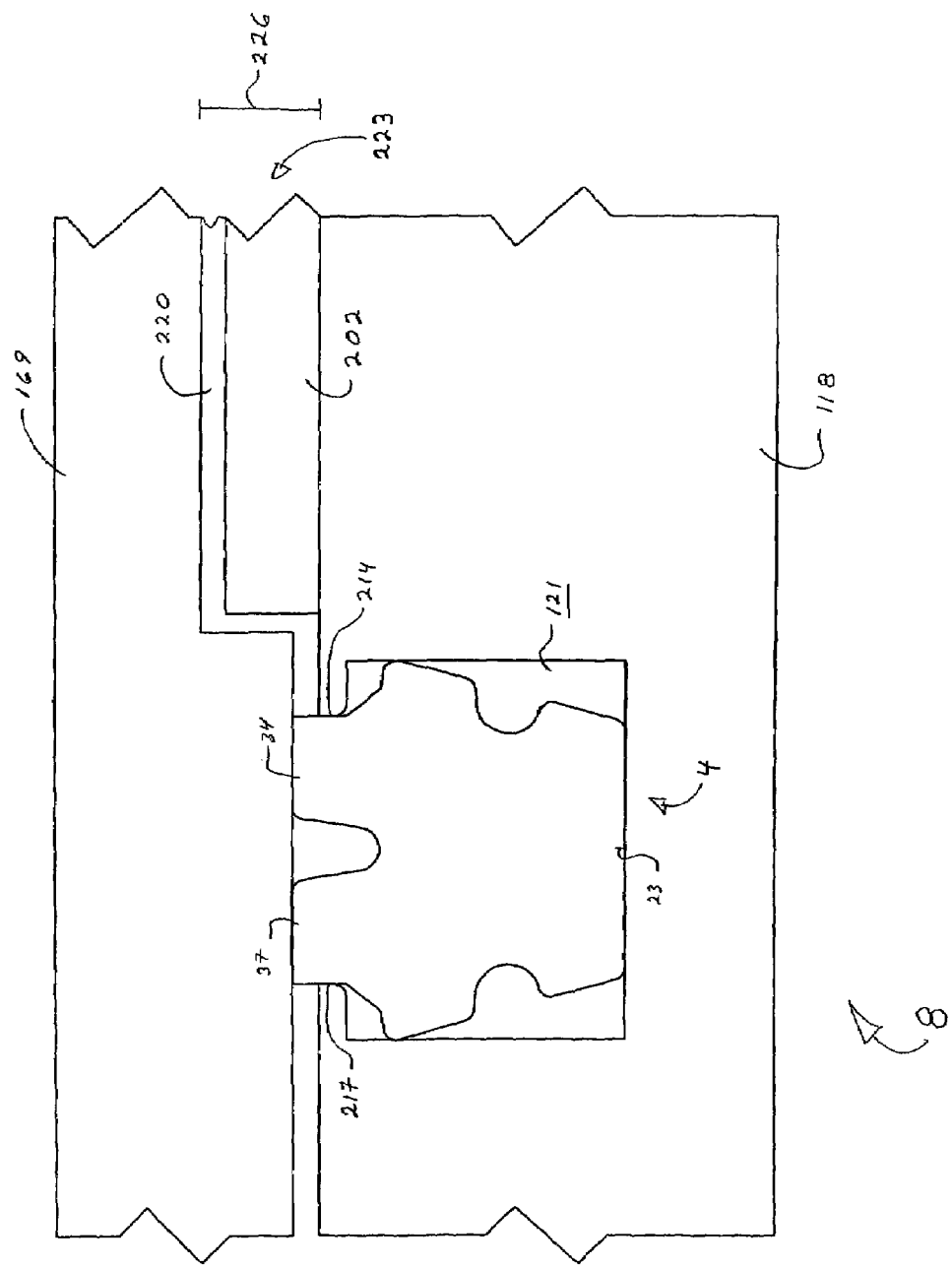
FIG. 5 is a representative sectional view of the mold apparatus of FIGS. 3 and 4, in which the first and second dies are positioned so as to compress and spread the injected coating composition.

A coating composition 220 is injected into second mold cavity 211, as depicted in FIG. 4. Coating composition 220 may be injected into second mold cavity 211 so as to fill the cavity and fully coat molded plastic article 202. Alternatively, coating composition 220 may only partially fill second mold cavity 211, as depicted in FIG. 4, in which case the method of the present invention further includes repositioning the dies so as to spread the injected coating composition over the surface of molded article 202. With reference to FIG. 5, first die 169 and second die 118 are positioned at a third distance 226 that is less than second distance 208 and greater than first distance 197, which results in compressing, and correspondingly spreading, the injected coating composition 220 over upper surface 205 of molded plastic article 202.

After injection, and optional spreading, of the coating composition into the mold, the injected coating composition may be cured, if it is a thermosetting coating composition (as will be discussed further herein). The mold apparatus is opened (e.g., by separating dies 169 and 118) and a coated molded (e.g., coated molded plastic article 223) is removed from the mold apparatus, in accordance with art recognized methods.

First seal 214 is maintained during the plastic and coating injection steps, and optional compression/spreading step, when first die 169 and second die 118 are positioned at first distance 197, second distance 208 and optional third distance 226. During the plastic and coating injection steps, and optional compressing/spreading step, gasket 4 is compressed along its vertical axis 23, and first force 79 is exerted laterally outward along exterior surface 43 of first extension 34, which serves to maintain seal 214 and prevent injected plastic material, and in particular injected coating composition from breaching the seal and leaking out of or otherwise fouling the mold apparatus. Correspondingly, as gasket 4 is compressed along vertical center axis 23 during the course of the plastic and coating injection steps, and optional compression/spreading step, second force 82 is exerted laterally outward along exterior surface 55 of second extension 37, which serves to maintain second seal 217, thereby further preventing injected material from leaking out of the mold apparatus if first seal 214 is breached.

The method of the present invention may also be performed using: (i) a gasket having a single extension (e.g., as described previously herein with reference to gasket 6 and FIG. 6); or (ii) a gasket having a first extension, a second extension and at least one further extension interposed there-between (e.g., as described previously herein with reference to gasket 7 and FIG. 8). For example, with reference to FIGS. 3-5, if gasket 6 of FIG. 6 is used in place of gasket 4, then only first seal 214 is formed and maintained during the plastic injection, paint injection and optional paint compression steps, while second seal 217 is not formed (due to the absence of the second extension). If gasket 6 is so used, first die 169 may have a downwardly extending extension (not shown) that is dimensioned to abut upper surface 166 of gasket 6, so as to evenly compress gasket 6 along vertical center axis 23 as the mold is closed.

The method of the present invention may include subsequent die positioning, mold cavity formation, coating injection and optional coating compression steps, that result in the formation of a coated molded plastic article having a plurality of coating layers. In an embodiment of the present invention, the method further includes the following additional steps: (i) positioning the first die and the second die at a subsequent distance, thereby forming a subsequent mold cavity; (ii) injecting a subsequent coating composition into the subsequent mold cavity; (iii) optionally positioning the first and second dies so as to compress the subsequently injected coating composition; and (iv) optionally repeating steps (i) through (iii) at least once. The subsequent steps (i) through (iv) result in the formation of a coated molded plastic article having a plurality of coating layers (e.g., 2, 3, 4 or more coating layers). The first and second seals are each maintained during steps (i) through (iv). The coating composition (i.e., the initial coating composition that is injected into the second mold cavity) and each subsequent coating composition may each be the same or different.

The subsequent distance at which the first and second dies (e.g., dies 169 and 118) are positioned, is greater than the first distance 197 and the third distance 226, and typically greater than the second distance 208 (see FIGS. 3-5). The subsequent positioning of the dies results in the formation of a subsequent mold cavity that is defined in part by the inner surface 172 of first die 169, the upper surface of the previously injected coating composition and a portion of exterior surface 43 of first extension 34 of gasket 4.

A subsequent coating composition may be injected into a subsequently formed mold cavity prior to curing of the previously injected coating composition. Typically, the previously injected coating composition is at least partially cured prior to injection of a subsequent coating composition.

The process of subsequent coating injection may be repeated numerous times with the same or different coating compositions. Multiple injections of coating compositions in accordance with the method of the present invention may, for example, result in the formation of a coated molded article having a primer coating abutting the molded plastic article, an outer clear coat layer and a color coat layer interposed between the primer coating layer and clear coat layer. In addition, multiple injections of coating compositions may result in the formation of a coated molded article having a first coating layer abutting the molded plastic article, an outer scratch-resistant clear coating layer, and optionally one or more coating layers interposed between the first coating layer and the scratch-resistant clear coating layer.

The thermoplastic material that is introduced into the first mold cavity of the mold apparatus, to form the uncoated molded article, may be selected from thermosetting plastic materials and/or thermoplastic materials. As used herein and in the claims, the term "thermosetting plastic material" and similar terms means plastic materials having a three dimensional crosslinked network resulting from the formation of covalent bonds between chemically reactive groups, e.g., active hydrogen groups and free isocyanate groups. In addition, as used herein and in the claims the term "thermosetting" is inclusive of thermal curing (e.g., curing at ambient or elevated temperatures) and/or curing my means other than thermal, e.g., by means of actinic light.

Thermosetting plastic materials that may be introduced into the first mold cavity to form the uncoated molded plastic article, include those known to the skilled artisan, e.g., crosslinked (crosslinkable) polyurethanes, crosslinked polyepoxides, crosslinked polyesters and crosslinked polycarbonates (e.g., formed from allyl functional carbonate monomers and oligomers). Of the thermosetting plastic materials, crosslinked polyurethanes are preferred. The uncoated molded article may be fabricated from crosslinked polyurethanes by the art-recognized process of reaction injection molding. In the present invention, reaction injection molding typically involves injecting separately, and preferably simultaneously, into the first mold cavity: (i) an active hydrogen functional component (e.g., a polyol, polyamine and/or polythiol); and (ii) an isocyanate functional component (e.g., a diisocyanate such as toluene diisocyanate, and/or dimers and trimers of a diisocyanate such as toluene diisocyanate). Alternatively, the active hydrogen functional component and the isocyanate functional component may be injected into the first mold cavity together through a single injection port or head (e.g., a reaction injection mixing head), as is known to the skilled artisan. The filled first mold cavity may optionally be heated to ensure and/or hasten complete reaction of the injected reactive components.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials that may be introduced into the first mold cavity to form the uncoated plastic molded article include, but are not limited to, thermoplastic polyurethane, thermoplastic polyurea, thermoplastic polyimide, thermoplastic polyamide, thermoplastic polyamideimide, thermoplastic polyester (e.g., polyethylene terephthalate and polybutylene terephthalate), thermoplastic polycarbonate, thermoplastic polysulfone, thermoplastic polyketone, thermoplastic polyalkylenes (e.g., thermoplastic polyethylene and thermoplastic polypropylene), thermoplastic acrylonitrile-butadiene-styrene and thermoplastic compositions containing one or more such recited thermoplastic materials.

Of the thermoplastic materials that may be introduced into the first mold cavity, thermoplastic polycarbonates are preferred. The uncoated plastic molded article (e.g., molded plastic article 202) may be fabricated from thermoplastic materials by the art-recognized process of injection molding, in which a molten stream of thermoplastic material (e.g., molten thermoplastic polycarbonate) is injected into the first mold cavity, which may be optionally heated. A preferred thermoplastic material that may be introduced into the first mold cavity to form the uncoated molded article is thermoplastic polycarbonate, e.g., MAKROLON thermoplastic polycarbonate, commercially available from Bayer MaterialScience LLC.

The thermosetting plastic materials and/or thermoplastic materials that may be introduced into the first mold cavity, may optionally be reinforced with a material selected from glass fibers, glass beads, carbon fibers, nano-tubular carbon fibers, boron fibers, metal fibers and combinations thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material (e.g., glass fibers) is typically present in the thermosetting plastic materials and/or thermoplastic materials that are introduced into the first mold cavity in a reinforcing amount (e.g., in an amount of from 5 percent by weight to 60 percent by weight, based on the total weight of the uncoated molded plastic article).

The plastic material introduced into the first mold cavity to form the uncoated molded article may further contain one or more functional additives other than or in addition to the reinforcing materials. Additives that may be present in the plastic material from which the uncoated molded article is formed include, but are not limited to, antioxidants, colorants, e.g., pigments and/or dyes, mold release agents, fillers (e.g., calcium carbonate and barium sulfate), ultraviolet light absorbers, fire retardants and mixtures thereof. Additives may be present in the plastic material from which the uncoated molded article is formed in functionally sufficient amounts, e.g., in amounts independently from 0.1 percent by weight to 10 percent by weight, based on the total weight of the plastic material.

The coating composition introduced into the second mold cavity (e.g., second mold cavity 211) in the method of the present invention may be selected from thermoplastic and/or thermosetting coating compositions. Thermoplastic coating compositions may include one or more of those thermoplastic polymers recited previously herein with regard to the thermoplastic material introduced into the first mold cavity (e.g., thermoplastic polyurethane and/or thermoplastic polycarbonate).

Preferably, the coating composition introduced into the second mold cavity is a thermosetting (or curable) coating composition that is capable of at least being partially cured (polymerized or cross-linked) therein. The thermosetting or curable coating composition may be selected from one-component compositions or two-component coating compositions that are known to the skilled artisan. One-component coating compositions include, for example, reactants having blocked isocyanate groups and reactants having active hydrogen groups. Two-component coating compositions include, for example: reactants having unblocked (or freely reactive) groups, such as free isocyanate groups and oxirane groups; and reactants having active hydrogen groups, such as hydroxyl, thiol, primary and secondary amines, or carboxylic acid groups. The reactants/components of a two-component coating composition are typically mixed together prior to injection into the mold, or are injected separately into the mold in such a way as to result in mixing upon injection. The coating compositions may include resins having backbones selected from, for example, polyethers (or polyepoxides), polyesters, polycarbonates, polyurethanes, poly(meth)acrylates and combinations thereof. Coating compositions that may be used in the method of the present invention include, but are not limited to, those described in U.S. Pat. Nos. 4,081,578, 4,293,659, 4,331,735, 4,366,109 and 4,668,460, the pertinent disclosures of which are incorporated by reference herein.

In an embodiment of the present invention, the coating composition introduced into the second mold cavity includes monomers and/or oligomers having terminal and/or pendent ethylenically unsaturated groups that are cured by free radical polymerization initiated by, for example, heat activated peroxide initiators or ultraviolet light. More particularly, the coating compositions typically include urethane components having terminal and/or pendent acrylate groups. In an embodiment of the present invention, the coating composition includes: the reaction product of a multi-functional isocyanate (e.g., toluene diisocyanate, methylene di-phenyl isocyanate, isophorone diisocyanate or condensates thereof) and a hydroxyl functional acrylate (e.g., 2-ethylhydroxy acrylate); a radical polymerization initiator (e.g., di-tertiary butyl peroxide); and optionally other multi-functional ethylenically unsaturated components (e.g., mono- and poly-alkyleneglycol diacrylates, such as diethylene glycol diacrylate). The coating composition may also include the reaction product of an epoxide (oxirane) functional material (e.g., the reaction product of trimethylol propane and epichlorohydrin) and a hydroxyl functional acrylate (e.g., 2-ethylhydroxy acrylate).

Thermosetting coatings introduced into the second mold cavity are at least partially cured, and are preferably substantially fully cured within the mold before removal of the coated molded plastic article there from. If cured by the application of actinic light (e.g., ultraviolet light), the first die (e.g., first die 169) typically must be fitted with a window to allow the introduction of such actinic light therein (not shown in the drawing figures). If cured by means of free radical polymerization, the application of heat is typically required to activate the free radical polymerization initiator. While two-component coating compositions do not necessarily require elevated temperatures to achieve cure, the application of heat is typically employed to accelerate the cure process. In general, with thermosetting coating compositions: cure times of 10 seconds to 60 minutes, typically 10 seconds to 2 minutes, and more typically 30 seconds to 30 minutes; and cure temperatures of 38° C. (100° F.) to 177° C. (350° F.) or 66° C. (150° F.) to 149° C. (300° F.), are employed.

The coating composition that is introduced into the second mold cavity may include additives. Classes of additives that may be included in the coating composition include, but are not limited to: static colorant pigments (e.g., inorganic and/or organic pigments); conductive pigments (e.g., conductive carbon blacks, carbon fibers and metallic pigments); photochromic materials; fillers (e.g., clays and talcs); ultraviolet light absorbers; thermal stabilizers; flow control agents; thickeners; and combinations thereof. The amount of additives included in the coating composition may vary widely. Typically, the coating composition contains from 0.1 to 50 percent by weight, more typically 0.1 to 20 percent by weight of additives, based on the total weight of the coating composition.

Static colorant pigments (e.g., $TiO_2$) do not appreciably change color upon exposure to ultraviolet (UV) light. Photochromic materials or substances (e.g., photochromic dyes and/or pigments) reversibly change color upon exposure to UV light, as is known to the skilled artisan. Examples of photochromic substances that may be included in the coating composition include art-recognized inorganic and organic photochromic substances. Examples of organic photochromic substances that may be used include, but are not limited to, spiro(indoline)naphth-oxazines, spiro(indoline)benzoxazines, chromenes (such as benzopyrans and naphthopyrans), organo-metal dithizonates (e.g., mercury dithizonates), fulgides (e.g., 3-furyl and 3-thienyl fulgides), fulgimides (e.g., 3-furyl and 3-thienyl fulgimides) and combinations thereof. The use of photochromic substances in the coating composition results in a coated molded article having photochromic properties, such as photochromic ophthalmic lenses, photochromic sun lenses and photochromic glazings (e.g., automotive and architectural windows or glazings).

The coating composition is introduced into the second mold cavity in an amount at least sufficient such that the coated molded plastic article has a coating thickness that provides a desired level of properties (e.g., smoothness, weatherability, scratch resistance and/or photochromaticity). Generally, the coating composition is introduced into the second mold cavity in an amount such that the coated molded plastic article has a coating thickness of 0.1 to 50 mils (2.54 to 1270 μm), typically from 0.5 to 20 mils (12.7 to 508 μm), and more typically from 0.5 to 3 mils (12.7 to 76.2 μm).

The method of the present invention may be used to prepare numerous types of coated molded plastic articles. Classes of coated molded articles that may be prepared by the method of the present invention include, but are not limited to, lenses, ophthalmic lenses, sunshade lenses, glazings, interior (passenger compartment) motor vehicle components (e.g., interior panels and dash board components), exterior motor vehicle components (e.g., exterior panels), motor vehicle engine-compartment components (e.g., filter housings and fuel injection housings), architectural panels (e.g., office walls and cubicle dividers) and housings for electronic devices (e.g., business/office machines, computer housings, portable phones and pagers). Coated lenses that may be prepared according to the present invention include, for example, lenses for lights such as motor vehicle head lamps, break lights, turn signal lights and landing lights on aircraft. Coated glazings that may be prepared according to the present invention include, for example, architectural windows, motor vehicle windows and aircraft windows.

As described previously herein, the coating composition may include a photochromic material, in which case the coated molded article prepared by the method of the present invention is a photochromic coated molded article. Photochromic molded articles that may be prepared by the present method include, but are not limited to photochromic ophthalmic lenses, photochromic sun shade lenses (i.e., non-corrective photochromic sunglasses or spectacles), and photochromic glazings, such as photochromic architectural windows, photochromic motor vehicle windows and photochromic aircraft windows. Photochromic coated molded articles prepared in accordance with the present method may have an underlying molded article fabricated from thermoplastic polycarbonate.

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a coated molded plastic article comprising:
   (a) providing a mold apparatus comprising,
      (i) a first die having an inner surface,
      (ii) a second die having an inner surface having at least one channel therein, each channel having a base surface, an open top, a first upper edge and a second upper edge, the inner surface of said first die and the inner surface of said second die are substantially opposed and have a distance there-between, at least one of said first die and said second die being reversibly moveable, such that said distance is reversibly decreased, and
      (iii) a gasket comprising an upper portion and a lower portion, said gasket having a longitudinal axis, a vertical center axis that is substantially perpendicular to said longitudinal axis, and a horizontal axis that is substantially perpendicular to said vertical center axis and said longitudinal axis,
      said upper portion comprising a first upper sidewall, a second upper sidewall, a first extension and a second extension, said upper portion being fabricated from a resilient material, said first extension and said second extension each extending upwardly from said upper portion and each extending substantially continuously in a direction that is substantially parallel with said longitudinal axis,
      said first extension and said second extension each having an exterior surface, an upper surface, an interior surface, and a vertical center line that is laterally outward from and substantially parallel to said vertical center axis of said gasket, the exterior surface of said first extension defining at least a portion of said first upper sidewall, the exterior surface of said second extension defining at least a portion of the second upper sidewall,
      the interior surface of said first extension and the interior surface of said second extension together defining an upper longitudinal groove, said upper longitudinal groove being aligned substantially parallel with said longitudinal axis, said lower portion having a base, and a first lower sidewall and a second lower sidewall each extending upwardly from said base, said lower portion being continuous with said upper portion, said first lower sidewall having at least one first exterior longitudinal groove, said second lower sidewall having at least one second exterior longitudinal groove, each first exterior longitudinal groove and each second exterior longitudinal groove being aligned substantially parallel with said longitudinal axis and providing a means by which said gasket is reversibly compressed along said vertical center axis of said gasket, and said lower portion being fabricated from a resilient material, wherein said vertical center line of said first extension resides over said first exterior longitudinal groove, said vertical center line of said second extension resides over said second exterior longitudinal groove, such that when said gasket is compressed along said vertical center axis of said gasket, a first force is exerted laterally outward along said exterior surface of said first extension, and a second force is exerted laterally outward along said exterior surface of said second extension, a portion of said gasket residing within said channel, said base of said lower portion of said gasket abutting said base surface of said channel, a portion of said first exterior surface of said first extension abutting sealingly with said first upper edge of said channel forming a first seal, a portion of said exterior surface of said second extension abutting sealingly with said second upper edge of said channel forming a second seal, and a portion of said inner surface of said first die abuts sealingly with the upper surface of each of said first extension and said second extension;

(b) positioning said first die and said second die at a first distance, thereby forming a parting line between said first die and said second die, and forming a first mold cavity defined in part by the inner surface of said first die and the inner surface of said second die, said gasket being compressed and the upper surface of said first extension and the upper surface of said second extension being substantially level with said parting line;

(c) injecting a plastic material into said first mold cavity, thereby forming a molded plastic article having an upper surface;

(d) positioning said first die and said second die at a second distance, said second distance being greater than said first distance, thereby forming a second mold cavity defined in part by the inner surface of said first die, the upper surface of said molded plastic article and a portion of the upper surface of said first extension of said gasket; and (e) injecting a coating composition into said second mold cavity, thereby forming said coated molded plastic article, wherein when said first die and said second die are positioned at said first distance and said second distance, said gasket is compressed along the vertical center axis of said gasket, said first force exerted laterally outward along said exterior surface of said first extension maintains said first seal, and said second force exerted laterally outward along said exterior surface of said second extension maintains said second seal during the plastic material injection step and the coating composition injection step.

2. The method of claim 1 further comprising positioning said first die and said second die, after the coating injection step, at a third distance that is less than said second distance and greater than said first distance, thereby compressing the coating composition injected into said second cavity.

3. The method of claim 1 further comprising,
(f) positioning said first die and said second die at a subsequent distance, thereby forming a subsequent mold cavity,
(g) injecting a subsequent coating composition into said subsequent mold cavity,
(h) optionally positioning said first die and said second die so as to compress said subsequent coating composition, and
(i) optionally repeating steps (f) through (h) at least once, thereby forming a coated molded plastic article having a plurality of coating layers, wherein said first seal and said second seal are each maintained during steps (f) through (h), and said coating composition and each subsequent coating composition are independently the same or different.

4. The method of claim 1 wherein said plastic material is selected from thermoplastic materials, thermosetting materials and combinations thereof.

5. The method of claim 4 wherein said plastic material introduced into said first mold cavity is a thermoplastic material selected from the group consisting of thermoplastic polyurethane, thermoplastic polyurea, thermoplastic polyimide, thermoplastic polyamide, thermoplastic polyamide-imide, thermoplastic polyester, thermoplastic polycarbonate, thermoplastic polysulfone, thermoplastic polyketone, thermoplastic polyethylene, thermoplastic polypropylene, thermoplastic acrylonitrile-butadiene-styrene and thermoplastic compositions containing one or more thereof.

6. The method of claim 4 wherein said plastic material introduced into said first mold cavity comprises a reinforcing material selected from the group consisting of glass fibers, glass beads, carbon fibers, nano-tubular carbon fibers, boron fibers, metal fibers and combinations thereof.

7. The method of claim 1 wherein said coating composition is selected from the group consisting of thermosetting coating compositions, thermoplastic coating compositions and combinations thereof.

8. The method of claim 7 wherein said coating composition is a thermosetting coating composition and comprises ethylenically unsaturated polyurethane and free radical polymerization initiator.

9. The method of claim 1 wherein the coating of said coated molded article has a thickness of from 0.1 mils to 50 mils.

10. The method of claim 1 wherein the coated molded article is selected from the group consisting of lenses, ophthalmic lenses, sun shade lenses, glazings, interior motor vehicle components, exterior motor vehicle components, motor vehicle engine-compartment components, architectural panels and housings for electronic devices.

11. The method of claim 1 wherein said coating composition comprises a photochromic material, and said coated molded article is a photochromic coated molded article.

12. The method of claim 11 wherein said photochromic coated molded article is selected from the group consisting of photochromic ophthalmic lenses, photochromic sun shade lenses and photochromic glazings.

* * * * *